United States Patent [19]

Hashimoto et al.

[11] Patent Number: 5,412,636
[45] Date of Patent: May 2, 1995

[54] APPARATUS FOR SERVO-CONTROLLING OBJECTIVE LENS IN RECORDING AND/OR REPRODUCING APPARATUS USING OPTICAL RECORD MEDIUM

[75] Inventors: Keitaro Hashimoto; Takashi Aoki, both of Tokyo, Japan

[73] Assignee: Olympus Optical Co., Ltd., Tokyo, Japan

[21] Appl. No.: 72,869

[22] Filed: Jun. 4, 1993

Related U.S. Application Data

[63] Continuation of Ser. No. 673,817, Mar. 22, 1991, abandoned.

[51] Int. Cl.⁶ .............................................. G11B 7/09
[52] U.S. Cl. .............................. 369/44.32; 369/44.35; 369/44.41; 369/54; 369/58
[58] Field of Search ............... 369/44.32, 44.25, 44.26, 369/44.27, 44.28, 44.33, 44.37, 44.41, 44.42, 124, 44.38, 44.11, 44.29, 44.35, 54, 58; 250/201.5; 235/454, 456

[56] References Cited

U.S. PATENT DOCUMENTS

| | | | |
|---|---|---|---|
| 4,611,316 | 9/1986 | Takeuchi et al. | 369/44.25 |
| 4,631,395 | 12/1986 | Ando | 369/44.42 |
| 4,719,614 | 1/1988 | Leterme et al. | 369/44.14 |
| 4,730,293 | 3/1988 | Pierce et al. | 369/44.38 |
| 4,787,075 | 11/1988 | Matsuoka et al. | 369/44.38 |
| 4,907,214 | 3/1990 | Nagano et al. | 369/44.25 |
| 4,918,415 | 4/1990 | Hashimoto et al. | 235/454 |
| 4,926,407 | 5/1990 | Yamamuro | 369/124 |
| 5,070,491 | 12/1991 | Horie | 369/44.42 |
| 5,155,718 | 10/1992 | Hashimoto et al. | 369/44.35 |

*Primary Examiner*—W. R. Young
*Assistant Examiner*—Thang V. Tran
*Attorney, Agent, or Firm*—Stevens, Davis, Miller & Mosher

[57] ABSTRACT

An apparatus for performing focusing control and tracking control for an objective lens of an optical head of an optical card reader and/or writer including first and second focusing error detecting systems for generating first and second focusing error signals, respectively, first and second tracking error detecting systems for generating first and second tracking error signals, respectively, a circuit for detecting a defect on an optical card to generate a defect signal, a selecting circuit for selecting one of the first and second focusing error signals and one of the first and second tracking error signals in accordance with the defect signal such that the selected error signals are free from the defect, a focusing actuator for moving the objective lens in the focusing direction in accordance with the selected focusing error signal, and a tracking actuator for moving the objective lens in the tracking direction in accordance with the selected tracking error signal.

16 Claims, 14 Drawing Sheets

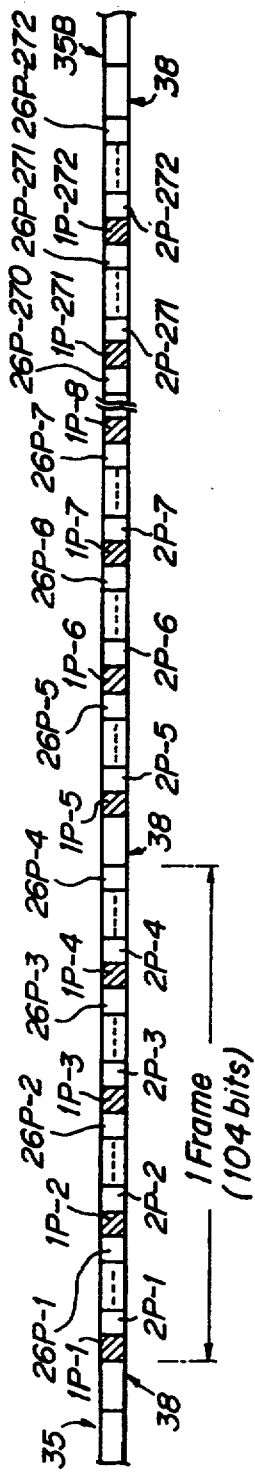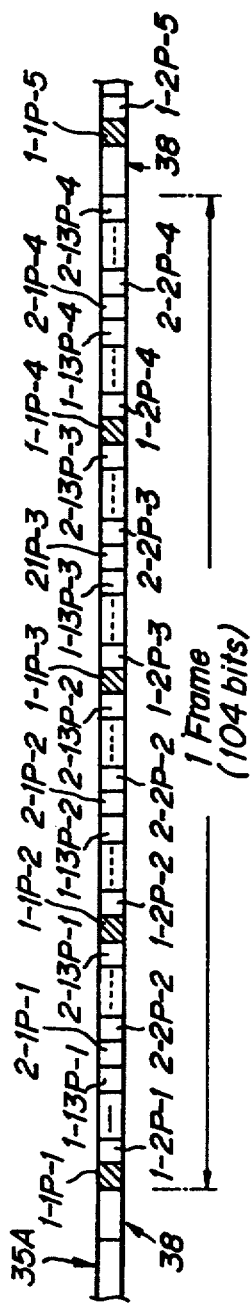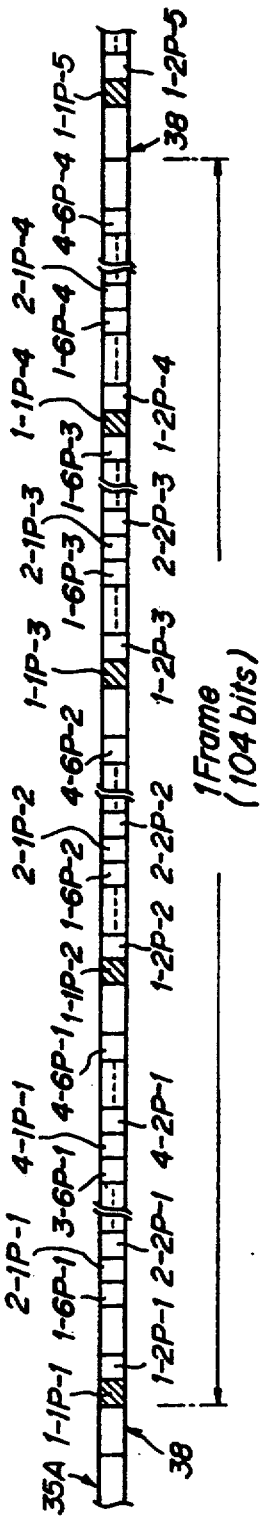

FIG._13

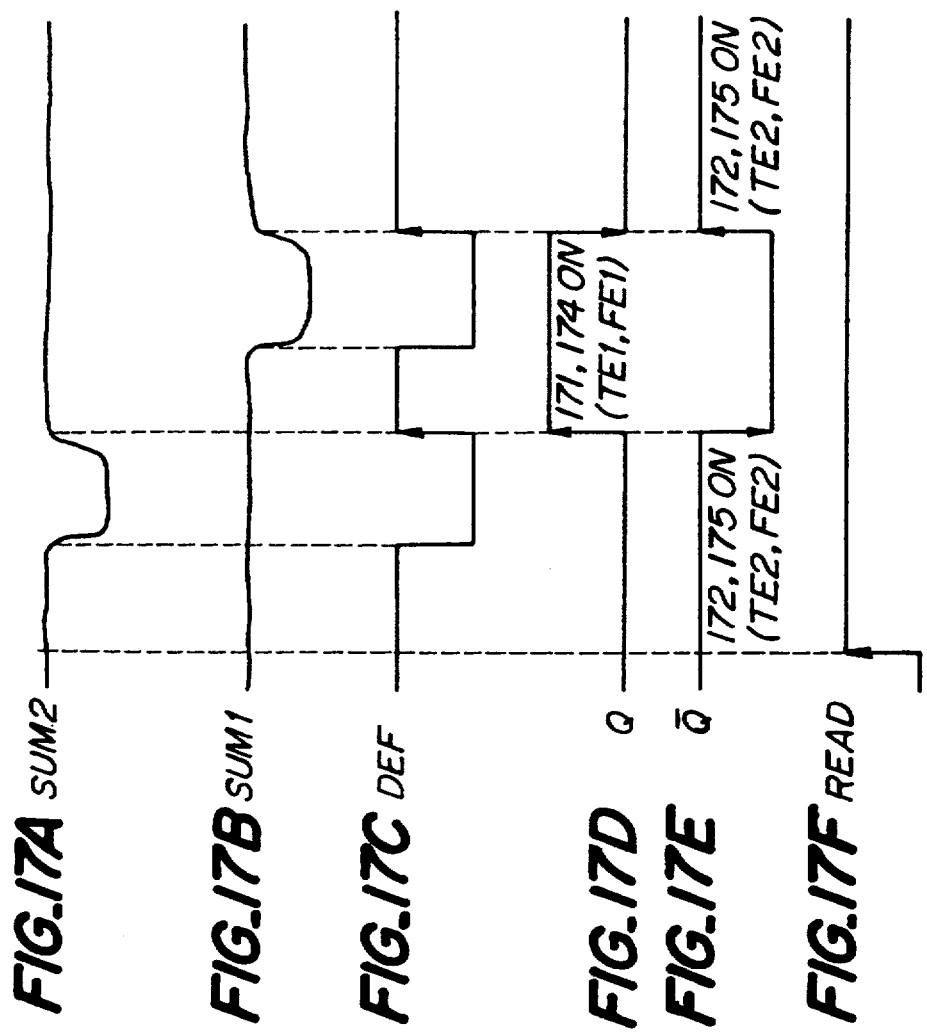

APPARATUS FOR SERVO-CONTROLLING OBJECTIVE LENS IN RECORDING AND/OR REPRODUCING APPARATUS USING OPTICAL RECORD MEDIUM

This application is a continuation of application Ser. No. 07/673,817, filed Mar. 22, 1991, now abandoned.

BACKGROUND OF THE INVENTION

Field of the Invention and Related Art Statement

The present invention relates to an apparatus for servo-controlling an objective lens provided in a recording and/or reproducing apparatus using an optical record medium such as an optical card and an optical disk.

In a recording and/or reproducing apparatus using an optical card, a servo-control signal representing a relative deviation of an objective lens and a record medium is detected and the objective lens is moved relative to the record medium in accordance with the servo-control signal. For instance, the objective lens is moved in a focusing direction parallel to an optical axis of the objective lens in accordance with a focusing error signal and at the same time the objective lens is moved in a tracking direction perpendicular both to the optical axis of the objective lens and to a track direction in which a number of tracks extend in accordance with a tracking error signal. There have been proposed various servo-control apparatuses for use in the recording and/or reproducing apparatus using an optical card. For instance, in Japanese Patent Application Publication Kokai-sho No. 62-275325 there is disclosed a servo-control apparatus in which the servo-control signal is derived by detecting a difference in the intensity between light beams reflected from two guide tracks for defining a data track therebetween. In Japanese Patent Application Publications Kokai-sho Nos. 62-279523 and 63-7533, there is also described a servo-control apparatus in which a servo-control signal is derived by detecting light reflected by a single clock pattern track provided in each track unit Including a plurality of data tracks.

In the above mentioned known servo-control apparatuses, when the guide track and clock pattern track include defects such as dust particles and damaged portions, it becomes impossible to detect the servo-control signal such as the focusing error signal and tracking error signal, so that the servo-control could not be performed correctly. For instance, the objective lens is moved into a far-defocused position and the light spot is deviated from the data track, and therefore the data can no longer be correctly recorded and/or reproduced.

SUMMARY OF THE INVENTION

The present invention has for its object to provide a novel and useful servo-control apparatus for use in an optical recording and/or reproducing apparatus using an optical record medium, in which even if a servo track such as the guide line and clock pattern line includes a defect, it is always possible to obtain a servo-control signal correctly and the servo-control can be performed accurately without being affected by the defect, so that the data recording and/or reproducing can be effected correctly.

According to the invention, a servo-control apparatus for correcting a positional deviation between an optical record medium including guide lines and data lines and an objective lens in an optical head of a data recording and/or reproducing apparatus using the optical record medium comprises:

sensing means including a plurality of error detecting systems for detecting a plurality of error signals of the same kind;

signal processing means for receiving said plurality of error signals and producing a servo-control signal on the basis of the error signals; and actuator means for correcting said positional deviation in accordance with the servo-control signal produced by said signal processing means.

In a preferred embodiment of the servo-control apparatus according to the invention, said sensing means comprises a plurality of error detecting systems which detect a plurality of guide lines simultaneously, and said signal processing means comprises a Judging means for judging the condition of said plurality of the error signals to produce a judgement signal, and a servo-control signal generating means for generating the servo-control signal in accordance with said judgement signal.

In another preferred embodiment of the servo-control apparatus according to the invention, said sensing means comprises a plurality of detecting systems for generating a plurality of error signals at different points on the same guide line, and said signal processing means comprises a defect detecting means for detecting defects on the optical record medium to produce a defect signal, and a selecting means for selecting one of said plurality of error signals in accordance with said defect signal, said error signal being not influenced by the defects.

BRIEF DESCRIPTION OF THE DRAWINGS

FIGS. 10A to 10C are diagrams expressing the data recording pattern;

FIGS. 17A to 17F are signal waveforms for explaining the operation of the signal processing circuit.

DESCRIPTION OF THE PREFERRED EMBODIMENTS

Figure 1:
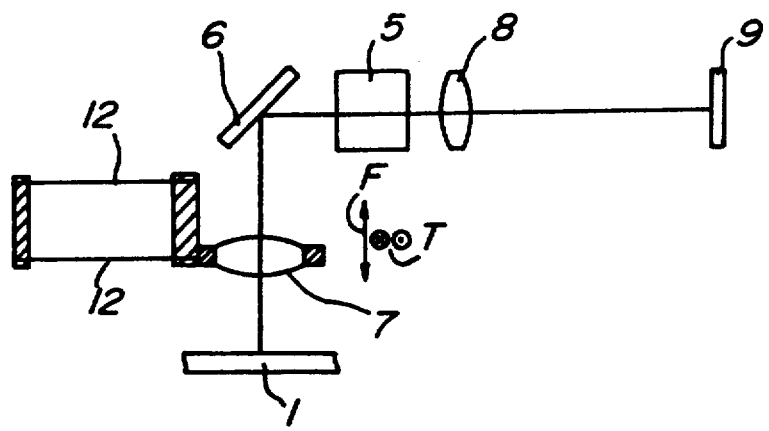
FIG. 1 is a schematic longitudinal cross sectional view showing an optical head of the optical card reader and writer including one embodiment of the servo-control apparatus according to the invention.
Figure 2:
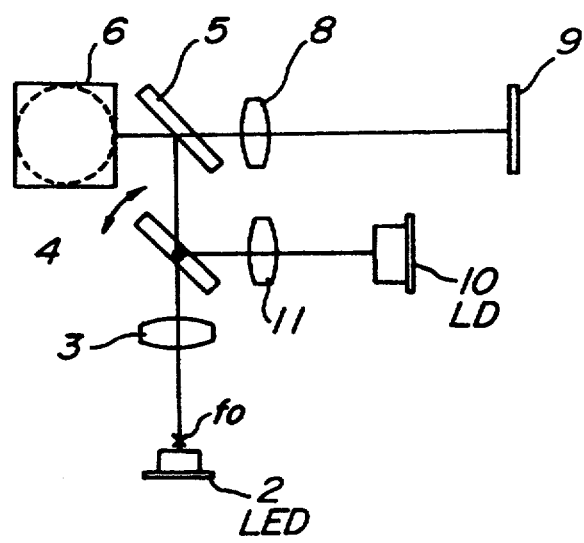
FIG. 2 is a schematic lateral cross sectional view of the optical head of FIG. 1.

FIGS. 1 and 2 are partially cross sectional front view and plan view showing the construction of an optical head of the optical card reader and writer comprising an embodiment of the servo-control apparatus according to the invention. In the present embodiment, an optical card 1 is used as the optical record medium. An illuminating light beam emitted by a light emitting diode (LED) 2 is made incident upon the optical card 1 as a large light spot by means of collimator lens 3, mirror 4, half mirror 5, mirror 6 and objective lens 7. As will be explained later, this light spot is large enough for illuminating a plurality of data lines and two guide lines simultaneously viewed in a direction perpendicular to the track direction. A light beam reflected by the optical card I is made incident upon a photodetector 9 by means of the objective lens 7, mirror 6, half mirror 5 and an imaging lens 8. A writing light beam generated by a laser diode (LD) 10 is made incident upon the optical card 1 as a very fine light spot by means of a collimator lens 11, the mirror 4, half mirror 5, mirror 6 and objective lens 7. It should be noted that this light spot is projected on a portion of the optical card 1 within the large spot of the illuminating light beam projected by the LED 2. Light of the writing light beam reflected by the optical card 1 is made incident upon the photodetector 9 by means of the objective lens 7, mirror 6, half mirror 5 and imaging lens 8.

The objective lens 7 is secured to a stationary member not shown by means of four resilient wires 12 movably in a focusing direction F parallel with an optical axis of the objective lens 7 as well as in a tracking direction T perpendicular to both the optical axis of the objective lens and the track direction. The objective lens 7 is moved in the focusing direction F and tracking direction T by means of focusing and tracking actuators, respectively. These focusing and tracking actuators have been known, so that they are not shown in FIGS. 1 and 2.

Figure 3:
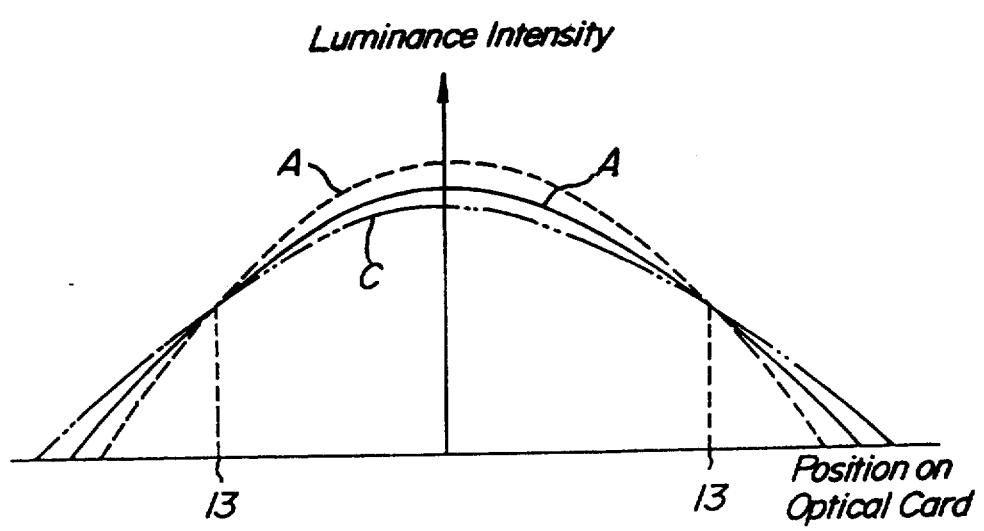
FIG. 3 is a graph representing the distribution in the intensity of the illuminating light beam on the optical card.

The LED 2 is arranged out of a focal point f₀ of the collimator lens 3. In the present embodiment, the LED 2 is arranged a farther distance away from the collimator lens than is the focal point f₀. Therefore, in an infocused condition of the objective lens 7 with respect to the optical card 1, the illuminating light emitted by the LED 2 is converged at a point which is situated nearer to the objective lens 7 than the optical card 1, so that the illuminating light is defocused on the optical card. When the objective lens 7 is in the in-focused position, the distribution in the luminance intensity of the illuminating light on the optical card 1 may be represented by a solid curve A In FIG. 3. When the optical card 1 is moved nearer to the objective lens 7, the distribution of the luminance intensity is changed as shown by a broken curve B, and when the optical card is moved far away from the objective lens, the distribution of the luminance intensity is varied as illustrated by a chain curve C, In this manner, the distribution in the luminance intensity of the illuminating light is changed in accordance with the distance between the optical card 1 and the objective lens 7. As shown in FIG. 3, there is produced a ring-shaped unchanged region 13 in which the luminance intensity is not substantially changed although the above distance is varied. The direction of the variation in the luminance intensity due to the fluctuation in the distance between the optical card and the objective lens in an inner area within the ring-shaped unchanged region 13 becomes opposite to that in an outer area situated outside the ring-shape unchanged region. That is to say, when the optical card 1 is moved toward the objective lens 7, the luminance intensity is increased in the inner area, but is decreased in the outer area, and when the optical card is moved away from the objective lens, the luminance intensity is decreased in the inner area, but is increased in the outer area. In the present embodiment, the track on the optical card i is illuminated effectively within the ring-shaped unchanged region 13, and the focusing error is detected by using the above mentioned variation of the distribution in the luminance intensity. It should be noted that the LD 10 is positioned at the focal point of the collimator lens 11.

Figure 4:
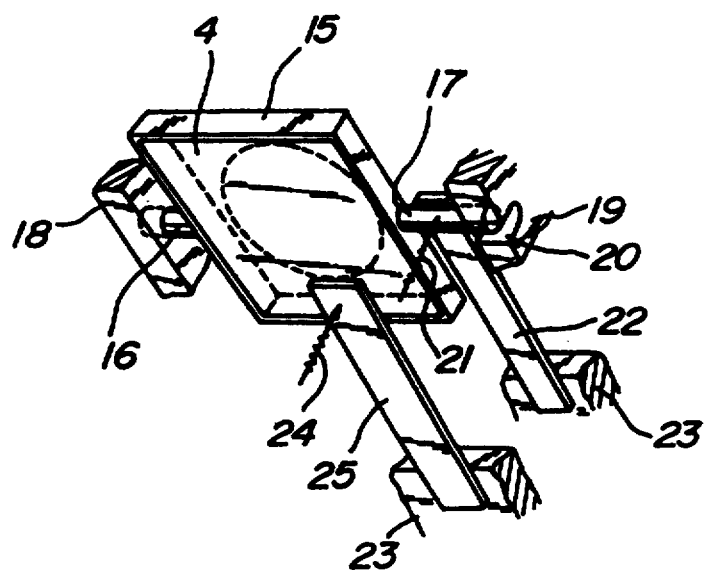
FIG. 4 is a perspective view illustrating the device for driving the mirror in the optical head of FIG. 1.

In the present embodiment, the mirror 4 is provided movably in such a manner that the light beam emitted by the LD 10 is moved in the track direction as well as in the tracking direction. As shown in FIG. 4, the mirror 4 is secured to a supporting frame 15 to opposite sides of which are secured pins 16 and 17, respectively. The pin 16 is supported by a stationary member 18 movably and swingably. The pin 17 is inserted into a recess 19 formed in a stationary member 20 by means of a coiled spring 21. To the pin 17 is secured one end of a bimorph 22 whose other end is secured to a stationary member 23. By driving the bimorph 22, the mirror 4 is swung against the force of the coiled spring 21 about the end point of the pin 16, so that the light spot on the optical card is moved in the track direction. The mirror 4 is further biased to rotate about the pins 16 and 17 by means of a coiled spring 24. To the supporting frame 15 is further secured one end of a bimorph 25 whose other end is secured to a stationary member 23. By driving the bimorph 25 it is possible to rotate the mirror 4 about the pins 16 and 17 against the force of the coiled spring 24, so that the light spot on the optical card 1 can be moved in the direction perpendicular to the track direction, i.e. tracking direction T. The mirror 4 is constructed such that it effectively transmits the light beam emitted by the LED 2, but effectively reflects the light beam emitted by the LD 10. To this end, a suitable coating having the wavelength selecting property is applied on the surface of the mirror 4.

Figure 5:
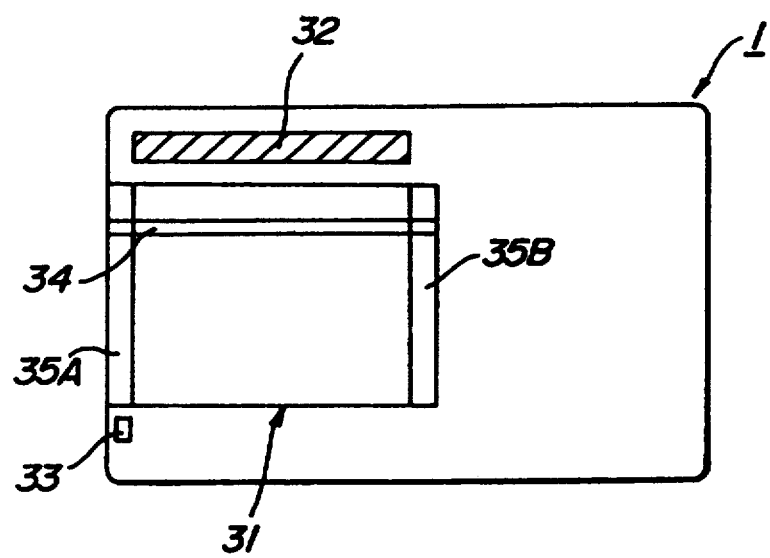
FIG. 5 is a plan view of the optical card.

FIG. 5 is a schematic plan view depicting an embodiment of the optical card 1. The optical card 1 comprises a data record region 31, a position detecting mark 32 for detecting the mutual position of the optical head and the optical card 1, and a reflecting portion 33 which is provided at such a position that when the optical card 1 has been set into the recording and/or reproducing apparatus correctly, the reflecting portion is faced with the optical head. In the data record region 31 there are provided a number of tracks 34 which extend in a direction parallel to a longitudinal direction of the optical card 1. In the data record region 31 there are also provided seek portions 35A and 35B at both ends of each tracks. In seek portions 35A and 35B of each respective track there are pre-recorded a track number of a relevant track.

Figure 6:
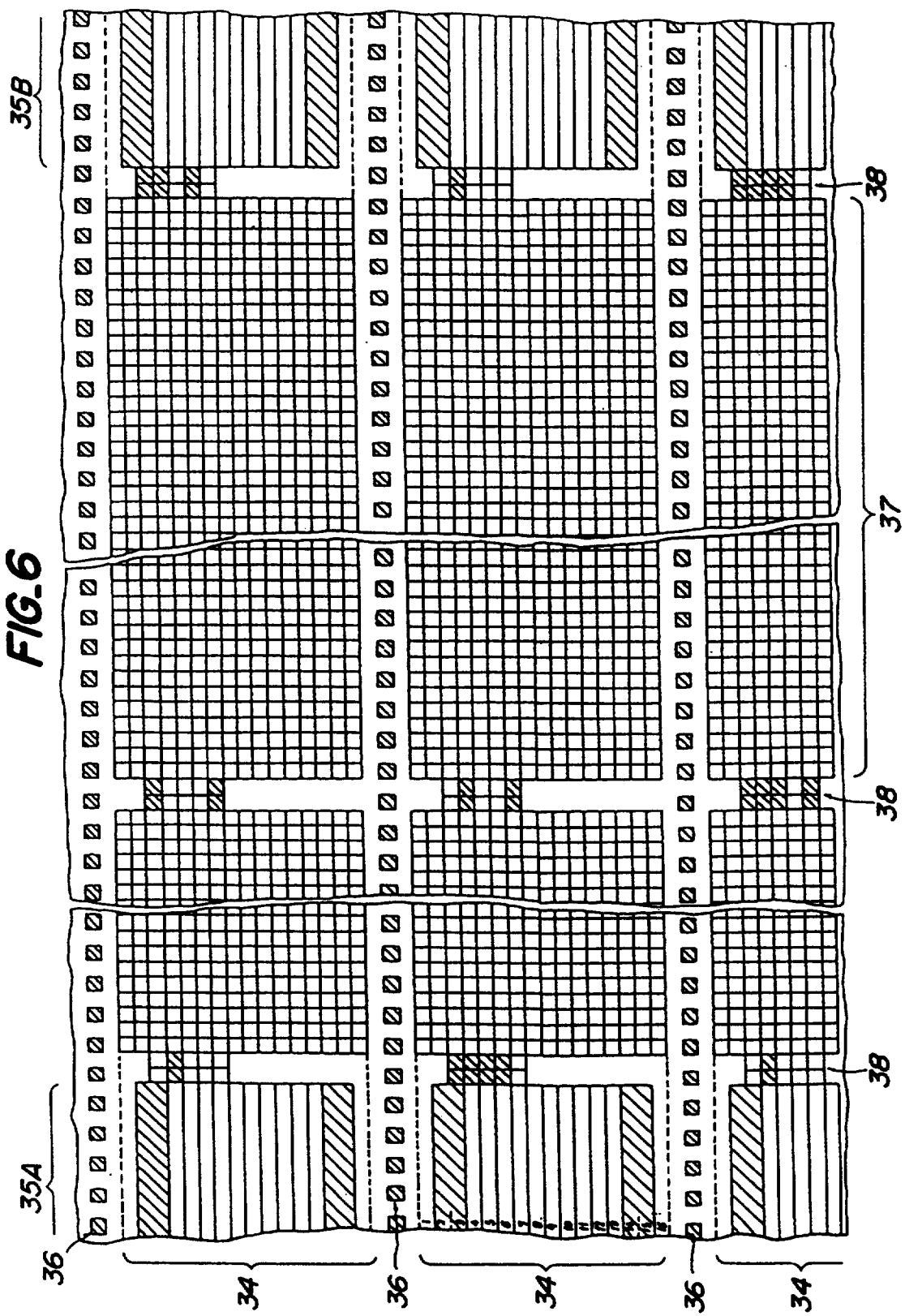
FIG. 6 is a diagram representing the track format of the optical card.

FIG. 6 is a schematic plan view showing the track construction of the optical card 1. A respective track 34 includes sixteen data lines which are equidistantly separated in the tracking direction T. Between successive tracks 34 there are provided clock pattern line 36, each of which is formed by an array of square blocks arranged at a constant pitch. Clock pattern lines are also provided above the uppermost track 34 and below the lowermost track 34. By reading the clock pattern line 36 it is possible to derive a clock signal and focusing and tracking error signals as will be explained later. In each of the seek portions 35A and 35B, there are recorded a track number pattern representing the track number of a relevant track and a predetermined recognizing pattern which is utilized to recognize the track number pattern. In the present embodiment, each track 34 is divided into 68 frames 37 between the seek portions 35A and 35B. Between successive frames 37 as well as between the seek portions 35A and 35B and the first and last frames, there are provided frame number record regions 38. Each frame 37 in each data line has a memory capacity of 104 bits, so that each data line has a memory capacity of 7072 bits (884 bytes). Each frame number record regions 38 has a data area of 2 bits.

Figure 7:
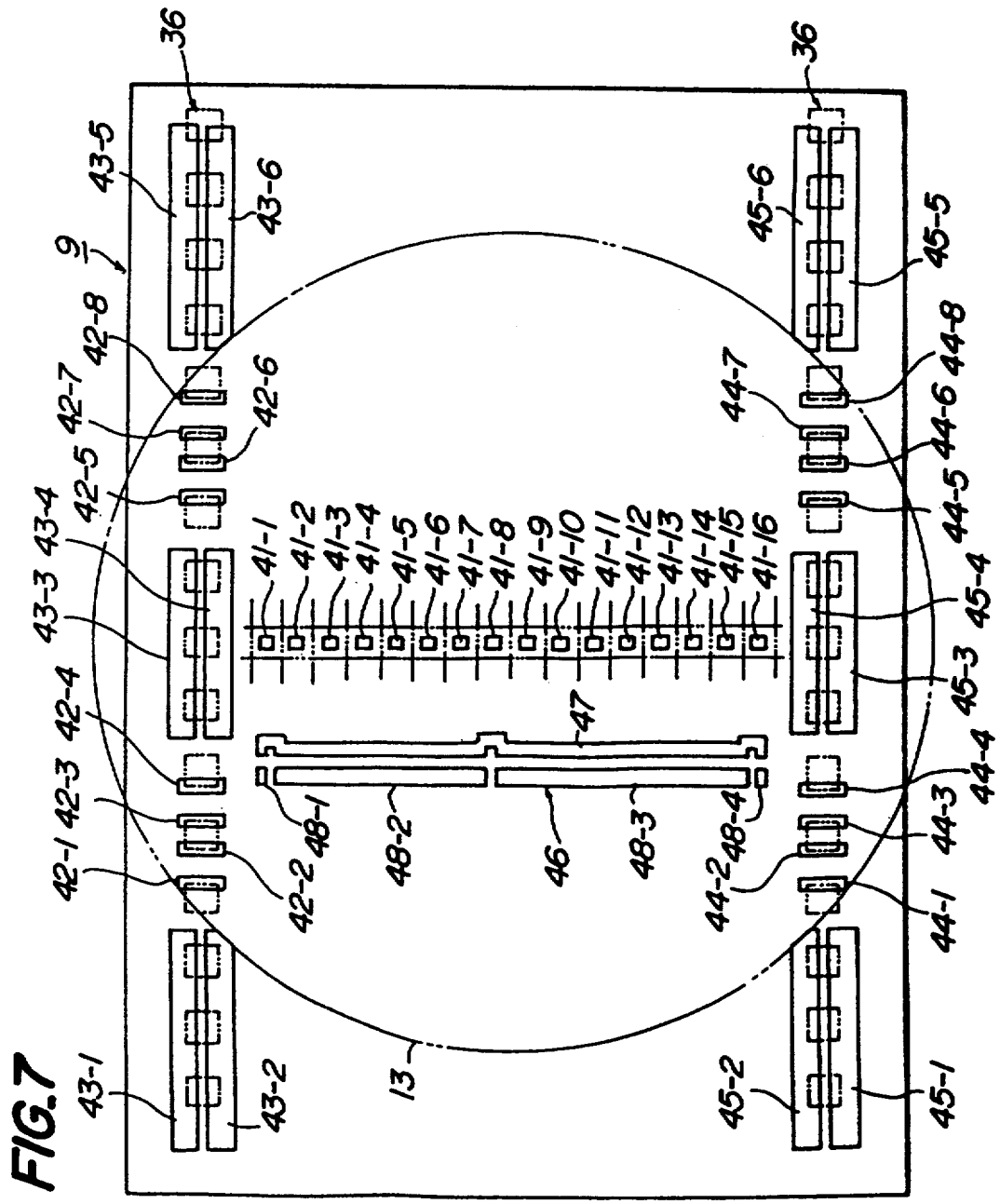
FIG. 7 is a plan view showing the construction of the photodetector shown in FIG. 1.

FIG. 7 is a schematic plan view illustrating the construction of the photodetector 9. The photodetector 9 comprises sixteen data reading light receiving regions 41-1 to 41-16 for reading sixteen data lines in a track 34 simultaneously. The photodetector 9 further includes eight clock generating light receiving regions 42-1 to 42-8 which are arranged equidistantly at a pitch which is equal to half the pitch of the clock pattern and receive the image of the upper clock pattern line 36, and three pairs of servo-control signal generating light receiving regions 43-1 to 43-6 which are arranged to receive images of upper and lower edges of the upper clock pattern line 36 viewed in the tracking direction. The photodetector 9 further comprises eight clock generating light receiving regions 44-1 to 44-8 which are arranged to receive the images of front and rear edges of the lower clock pattern line 36 viewed in the track direction and are separated from each other by half the pitch of the clock pattern. The photodetector 9 includes three pairs of servo-control signal generating light receiving regions 45-1 to 45-6 for receiving images of upper and lower edges of the lower clock pattern line 36.

In order to project the writing light beam emitted by the LD 10 onto a desired data line, a positioning light receiving portion 46 extending in the tracking direction is provided in the photodetector 9. In the present embodiment, at first the writing light beam is made incident upon the reflecting portion 33 on the optical card 1 at three points corresponding to the first line, eighth line and sixteenth line in a track 34 successively by applying first, second and third sets of driving signals to the bimorphs 22 and 25, and these driving signals for the bimorphs are stored in memories as will be explained later. From the first and second sets of driving signals corresponding to the first and eighth lines, respectively, six sets of driving signals for the bimorphs 22 and 25 for positioning the light beam onto the second to seventh lines are calculated, and similarly seven sets of driving signals for positioning the light spot onto ninth to fifteenth lines are calculated from the second and third sets of driving signals. To this end, the positioning light receiving portion 46 comprises an elongated light receiving region 47 which includes recesses at positions corresponding to the first, eighth and sixteenth lines, and light receiving regions 48-1 to 48-4 which are separated at the positions corresponding to the first, eighth and sixteenth lines.

The data reading light receiving regions 41-1 to 44-16, clock generating light receiving regions 42-1 to 42-8 and 44-1 to 44-8, servo-control signal generating light receiving regions 43-3, 43-4 and 45-3, 45-4 and positioning light receiving portion 46 are all provided within the ring-shaped unchanged region 13, and the servo-control signal generating light receiving regions 43-1, 43-2, 43-5, 43-6 and 45-1, 45-2, 45-5, 45-6 are all arranged outside the unchanged region 13.

In the present embodiment, during the track seek operation, the focusing error signal is derived from the output signals of the servo-control signal generating light receiving regions 43-1 to 43-6 and 45-1 to 45-6, and the focusing servo-control is performed in accordance with the focusing error signal. At the same time the optical card 1 and the optical head are relatively moved in the tracking direction T to scan the seek portions 35A or 35B. When the predetermined track number recognizing pattern is detected in the output signals of the data reading light receiving regions 41-1 to 41-16, the track number is read out and a desired track is sought. During the data reading operation, the focusing and tracking error signals are derived from the output signals of the servo-control signal generating light receiving regions 43-1 to 43-6 and 45-1 to 45-6, and the focusing and tracking servo-controls are performed in accordance with the thus detected focusing and tracking error signals. At the same time, the optical card 1 and optical head are relatively moved in the track direction to derive a clock signal from output signals of the clock generating light receiving regions 42-1 to 42-8 and 44-1 to 44-8. In synchronism with the thus derived clock signal, the output signals of the data reading light receiving regions 41-1 to 41-16 are sampled to reproduce a data signal.

When a data signal is to be written on the sought track 34, the light beam emitted from the LD 10 is positioned on a desired line within the track by suitably driving the bimorphs 22 and 25 on the basis of the first, second and third sets of driving signals corresponding to the first, eighth and sixteenth lines, respectively at the reflecting portion 33 on the optical card 1 in the same manner as that explained above. Then the optical card 1 and optical head are relatively moved in the track direction, while the focusing and tracking servo-controls are performed, and the intensity of the laser light emitted by the LD 10 is modulated in accordance with the data signal to be recorded.

Figure 8:
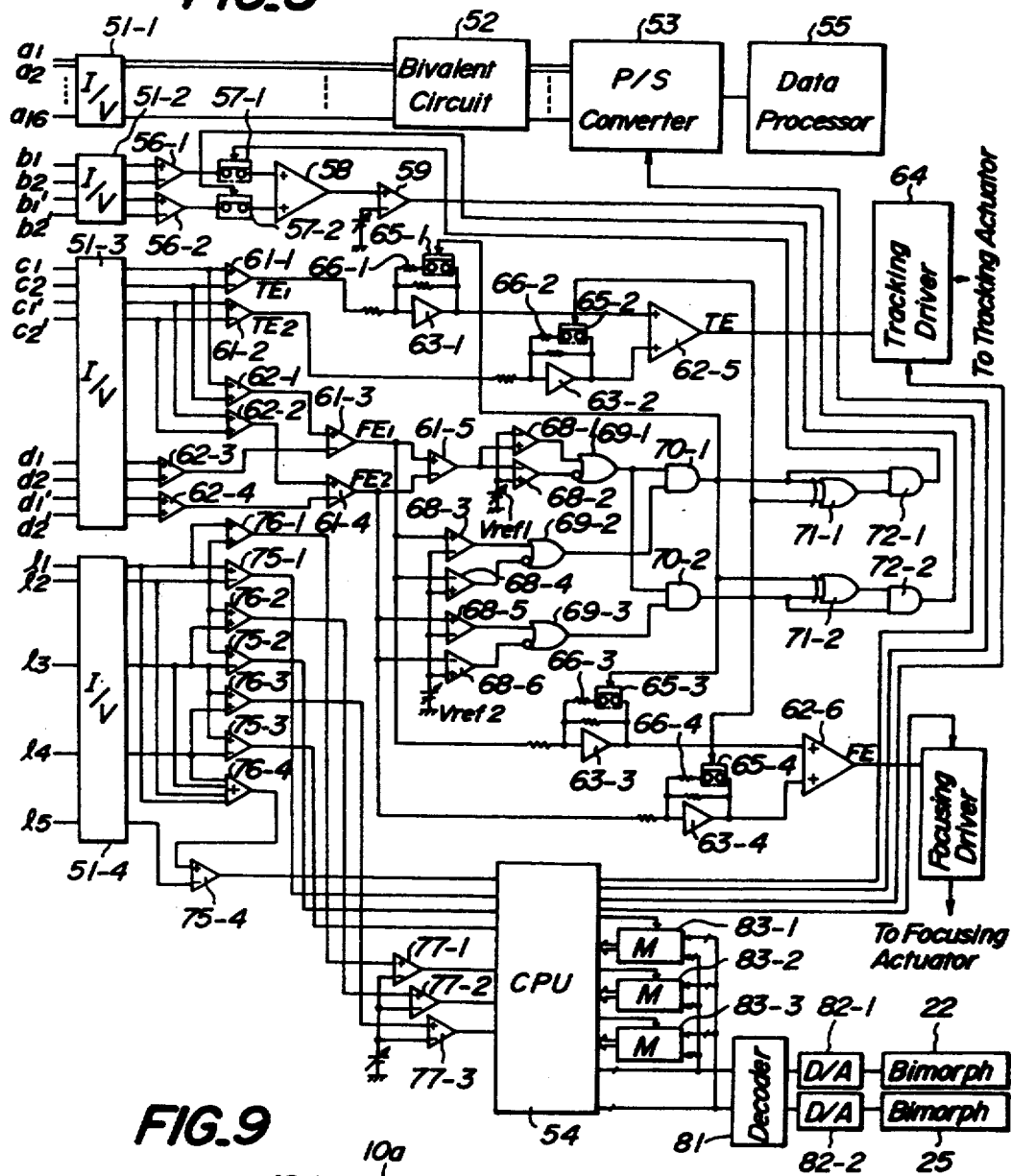
FIG. 8 is a circuit diagram depicting the signal processing circuit of the servo-control apparatus according to the invention.

FIG. 8 is a block diagram showing the construction of the signal processing circuit of the servo-control apparatus according to the invention. The output signals $a_1$ to $a_{16}$ generated by the data reading light receiving regions 41-1 to 41-16 are first converted by a current-voltage converter (I/V) 51-1 into voltage signals. The voltage signals thus obtained are applied to a bivalent circuit 52 and are converted into bivalent signals, which are then supplied to a parallel/serial converter 53. In the parallel/serial converter 53, the bivalent signals are latched by a latch signal supplied from a central processing unit (CPU) 54 and synchronized with the clock signal. Then the thus obtained serial data signal is supplied to a data processor 55.

A sum signal $b_1$ of the output signals of the clock generating light receiving regions 42-1, 42-3 and 42-5, a sum signal $b_2$ of the output signals of the clock generating light receiving regions 42-2, 42-4 and 42-6, a sum signal $b_1'$ of the output signals of the clock generating light receiving regions 44-1, 44-3 and 44-5, and a sum signal $b_2'$ of the output signals of the clock generating light receiving regions 44-2, 44-4 and 44-6 are derived and these sums are supplied to a current/voltage converter 51-2 and are converted into voltage sum signals, The sum signals $b_1$ and $b_2$ are then applied to a differential amplifier 56-1 to derive a difference therebetween, and the sum signals $b_1'$ and $b_2'$ are applied to a differential amplifier 56-2 to derive a difference therebetween. These differences generated by the differential amplifiers 56-1 and 56-2 are added in an adder 58 by means of normally closed switches 57-1 and 57-2. An output signal of the adder 58 is converted into a bivalent signal by means of a comparator 59 to obtain the clock signal which is supplied to the CPU 54. When the clock signal can not be obtained from the comparator 59 due to defects on the optical card 1 such as dust particles and damaged portions, the CPU 54 produces a quasi-clock signal on the basis of the normal clock signal which has been produced by that time.

The output signals $c_1$ and $c_2$ of the servo-control signal generating light receiving regions 43-3 and 43-4, the output signals $c_1'$ and $c_2'$ of the servo-control signal generating light receiving regions 45-3 and 45-4, a sum signal $d_1$ of the output signals of the light receiving regions 43-1 and 43-2, a sum signal $d_2$ of the output signals of the light receiving regions 43-5 and 43-6, a sum signal $d_1'$ of the output signals of the light receiving regions 45-1 and 45-2, a sum signal $d_2'$ of the output signals of the light receiving regions 45-5 and 45-6 are converted by a current/voltage converter 51-3 into voltage signals, The signals $c_1$ and $c_2$ are applied to a differential amplifier 61-1 to derive a first tracking error signal TE1, and the signals $c_1'$ and $c_2'$ are applied to a differential amplifier 61-2 to derive a second tracking error signal TE2. The output signals $c_1$ and $c_2$ are added in an adder 62-1, the output signals $c_1'$ and $c_2'$ are added in an adder 62-2, the output signals $d_1$ and $d_2$ are added in an adder 62-3 and the output signals $d_1'$ and $d_2'$ are added in an adder 62-4. Output signals of the adders 62-1 and 62-3 are applied to a differential amplifier 61-3 to derive a first focusing error signal FE1, and output signals of the adders 62-2 and 62-4 are applied to a differential amplifier 61-4 to obtain a second focusing error signal FE2. The first tracking error signal TE1 produced by the differential amplifier 61-1 is applied to one input of an adder 62-5 through an amplifier 63-1 and the second tracking error signal TE2 produced by the differential amplifier 61-2 is applied to the other input of the adder 62-5 through an amplifier 63-2. Then the adder 62-5 generates a final tracking error signal TE. The tracking error signal TE thus obtained is supplied to a tracking driver 64 and the tracking servo-control is performed on the basis of the tracking error signal TE under the control of the CPU 54. To the amplifier 63-1 is connected a feedback resistor 66-1 via a normally opened switch circuit 85-1. When the switch circuit 65-1 is made on, a gain of the amplifier 63-1 is reduced by five times. Similarly, to the amplifier 63-2 is connected a feedback resistor 66-2 by means of a normally opened switch circuit 65-2 to reduce a gain of the amplifier by five times by closing the switch circuit.

The first focusing error signal FE1 generated by the differential amplifier 61-3 is applied to one input of a differential amplifier 61-5 as well as to one input of an adder 62-6 via an amplifier 63-3, and the second focusing error signal FE2 generated by the differential amplifier 61-4 is applied to the other input of a differential amplifier 61-5 as well as to the other input of the adder 62-6 via an amplifier 63-4. Then, the adder 62-6 produces a final focusing error signal FE. The focusing error signal FE thus obtained is supplied to a focusing driver 67 which performs the focusing servo-control under the control of the CPU 54. Similar to the amplifiers 63-1 and 63-2, to the amplifier 63-3 is connected a feedback resistor 66-3 via a normally opened switch circuit 65-3 and to the amplifier 63-4 is connected a feedback resistor 66-4 by means of a normally opened switch circuit 65-4, so that gains of these amplifiers 63-3 and 63-4 can be selectively reduced by five times by closing the switch circuits The output signal of the differential amplifier 61-5 is applied to a non-inverted input of a comparator 68-1 and to an inverted input of a comparator 68-2, and to the inverted input and non-inverted input of these comparators are applied a predetermined voltage $V_{ref1}$. An output signal of the comparator 68-1 is applied to one input of an OR circuit 69-1 and an output signal of the comparator 68-2 is applied to the other inverted input of the OR circuit. When $|FE1-FE2| \leq V_{ref1}$, the output signal of the OR circuit 69-1 becomes the logic low level, otherwise the output signal of the OR circuit becomes the logic high level. The output signal of the OR circuit 69-1 is applied to one inputs of AND circuits 70-1 and 70-2.

The first focusing error signal FE1 generated by the differential amplifier 61-3 is applied to a non-inverted input of a comparator 68-3 and to an inverted input of a comparator 68-4, and the second focusing error signal FE2 generated by the differential amplifier 61-4 is applied to a non-inverted input of a comparator 68-5 and to an inverted input of a comparator 68-6. To the inverted inputs of the comparators 68-3 and 68-5 and to the non-inverted inputs of the comparators 68-4 and 68-6 are applied a predetermined voltage $V_{ref2}$. An output signal of the comparator 68-3 to one input of an OR circuit 69-2 to whose other input is applied an inverted output signal of the comparator 68-4. An output signal of the comparator 68-5 is applied to one input of an OR circuit 69-3 and an output signal of the comparator 68-6 is applied to the other inverted input of the OR circuit 69-3. When $|FE1| \leq V_{ref2}$, the output signal of the OR circuit 69-2 assumes the logic low level, and when the above inequivalume is not satisfied, the output signal becomes the logic high level. The output signal of the OR circuit 69-2 is applied to the other input of the AND circuit 70-1. When the AND circuit 70-1 produces the output signal having the logic high level, the switch circuits 65-1 and 65-3 are closed. When $|FE2| \leq V_{ref2}$, the output signal of the OR circuit 69-3 assumes the logic low level, and when the above inequivalume is not satisfied, the output signal becomes the logic high level. The output signal of the OR circuit 69-3 is applied to the other input of the AND circuit 70-2. When the AND circuit 70-2 produces the output signal having the logic high level, the switch circuits 65-2 and 65-4 are closed.

The output signals of the AND circuits 70-1 and 70-2 are applied to exclusive OR circuit 71-1 and 71-2, respectively, and output signals of these exclusive OR circuits are applied to one inputs of AND circuits 72-1 and 72-2, respectively. To the other input of the AND circuit 72-1 is applied the output signal of the AND circuit 70-1, When an output signal of the AND circuit 72-1 assumes the logic high level, i.e. when the output signal of the AND circuit 70-1 is in the logic high level and the output signal of the AND circuit 70-2 is in the logic low level, the switch circuit 57-1 is made off. To the other input of the AND circuit 72-2 is applied the output signal of the AND circuit 70-2. When an output signal of the AND circuit 72-2 assumes the logic high level, i.e. when the output signal of the AND circuit 70-1 is in the logic low level and the output signal of the AND circuit 70-2 is in the logic high level, the switch circuit 57-2 is made off.

As explained above, when $|FE1-FE2| \leq V_{ref1}$, the clock signal is derived on the basis of $(b_1-b_2)+(b_1'-b_2')$, the focusing error signal FE is obtained in accordance with (FE1+FE2), and the tracking error signal TE is formed from (TE1+TE2). When $|FE1-FE2| > V_{ref1}$, $|FE1| > V_{ref2}$ and $|FE2| \leq V_{ref2}$, the clock signal is obtained from $(b_1'-b_2')$, the focusing error signal FE is derived from (FE1/5+FE2) and the tracking error signal TE is produced in accordance with (TE1/5+TE2).

In the case in which $|FE1-FE2| > V_{ref1}$, $|FE1| \leq V_{ref2}$ and $|FE2| > V_{ref2}$, the clock signal is derive from $(b_1-b_2)$, the focusing error signal FE is derived from (FE1+F2/5) and the tracking error signal TE is produced in accordance with (TE1+TE2/5). When $|FE1-FE2| > V_{ref1}$, $|FE1| > V_{ref2}$ and $|FE2| > V_{ref2}$, the clock signal is derive from $(b_1-b_2)+(b_1'-b_2')$, the focusing error signal FE is derived from (FE1+FE2)/5 and the tracking error signal TE is produced in accordance with (TE1+TE2)/5. In this case, if it is impossible to produce the desired clock signal, the quasi-clock signal is produced on the basis of the clock signal which has been generated by that time.

In the present embodiment, the images of the two clock pattern lines 36 are simultaneously detected and the clock signal, focusing error signal and tracking error signal are produced in the manner explained above, so that even if one of the two clock pattern lines includes a defect such as dust particles and damaged portions, the above mentioned signals can be effectively obtained, so that the data recording and reproducing can be performed always correctly without causing the deviation in the servo-control.

Output signals $l_1$ to $l_4$ of the light receiving regions 48-1 to 48-4 of the positioning light receiving portion 46 and an output signal of the light receiving region 47 are supplied to a current/voltage converter 51-4 and are converted into voltage signals, The output signals $l_1$ and $l_2$ are applied to a differential amplifier 75-1 to derive a difference therebetween, the output signals $l_2$ and $l_3$ are applied to a differential amplifier 75-2 to derive a difference therebetween, and the output signals $l_3$ and $l_4$ are applied to a differential amplifier 75-3 to derive a difference therebetween. These difference signals are applied to the CPU 54. The output signals $l_1$ and $l_2$ are applied to an adder 76-1, the output signals $l_2$ and $l_3$ are applied to an adder 76-2, and the output signals $l_3$ and $l_4$ are applied to an adder 76-3. Output signals of these adders 76-1 to 76-3 are converted by comparators 77-1 to 77-3 into bivalent signals which are then supplied to the CPU 54. The output signals $l_1$ to $l_4$ are added by an adder 76-4 and an output of the adder is applied to one input of a differential amplifier 75-4 to whose other input is applied the output signal $l_5$. An output signal of this differential amplifier 75-4 is supplied to the CPU 54.

The bimorphs 22 and 25 for moving the spot of the light beam emitted by the LD 10 on the optical card 1 in the track direction and tracking direction are driven by the driving signals generated by the CPU 54 via decoder 81 and D/A converters 82-1 and 82-2. The driving signals generated by the decoder 81 are also supplied to memories 83-1 to 83-3 and are stored therein under the control of the CPU 54.

In the present embodiment, after the optical card 1 has been set in the optical card reader/writer and the optical head has been moved into a home position, the light beam emitted by the LD 10 and having a lower power is made incident upon the reflecting portion 33 on the optical card 1. By applying three sets of driving signals to the bimorphs 22 and 25, the light spot is successively indexed at positions corresponding to the first, eighth and sixteenth lines, respectively within a track 34, and these three sets of the driving signals for the bimorphs 22 and 25 are stored in the memories 83-1 to 83-3, respectively.

Figure 9:
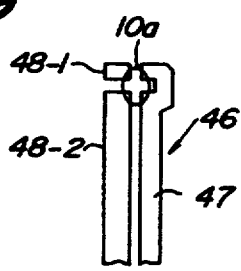
FIG. 9 is a partial plan view of the photodetector.

At first, the bimorph 25 is driven by the CPU 54 by means of the decoder 81 and D/A converter 82-2 so that the spot of the light emitted by the LD 10 is moved in the tracking direction. When the comparator 77-1 produces the output of the logic high level and the output signal of the differential amplifier 75-1 becomes zero, the driving signal for the bimorph 25 is stored in the memory 83-1. Then, the bimorph 22 is driven by the CPU 54 by means of the decoder 81 and D/A converter 82-1 to move the light spot in the track direction. When the output signal of the differential amplifier 75-4 becomes zero, the driving signal for the bimorph 22 is stored in the memory 83-1. In this manner, the light spot 10a of the light beam emitted by the LD 10 is made incident upon a first point of the reflecting portion 33 on the optical card 1 and the light beam reflected by the reflecting portion is made incident upon the light receiving regions 47, 48-1 and 48-2 as illustrated in FIG. 9. The output signals $l_1$, $l_2$ and $l_5$ have the following relations: $l_1 = l_2$ and $l_1 + l_2 = l_5$. This results in that the light spot 10a has been indexed onto the first point corresponding to the first line in the data track 34 on the optical card 1, and the first set of driving signals for the bimorphs 22 and 25 has been stored in the memory 83-1.

Next, the bimorph 25 is driven again to move the light spot in the tacking direction until the output signal of the comparator 77-2 becomes the logic high level and the output signal of the differential amplifier 75-2 becomes zero. Then, the driving signal for the bimorph 25 is stored in the memory 83-2. Next, the bimorph 22 is driven again to move the light spot in the track direction until the output signal of the differential amplifier 75-4 becomes zero. When the output signal of the differential amplifier 75-4 becomes zero, the driving signal for the bimorph 22 is stored in the memory 83-2. In this manner, the second set of driving signals for the bimorphs 22 and 25 have been stored in the memory 83-2 and the output signals $l_2$, $l_3$ and $l_5$ of the light receiving regions 48-2, 48-3 and 47 have the following relations: $l_2 = l_3$ and $l_2 + l_3 = l_5$. In this manner, the light spot 10a of the light beam emitted by the LD 10 has been indexed at the second point corresponding to the eighth line in the track 34 and the second set of driving signals for the bimorphs 22 and 25 has been stored in the memory 83-2.

Next, the bimorph 25 is driven again to move the light spot in the tacking direction until the output signal of the comparator 77-3 becomes the logic high level and the output signal of the differential amplifier 75-3 becomes zero. Then, the driving signal for the bimorph 25 is stored in the memory 83-3. Next, the bimorph 22 is driven again to move the light spot in the track direction until the output signal of the differential amplifier 75-4 becomes zero. When the output signal of the differential amplifier 75-4 becomes zero, the driving signal for the bimorph 22 is stored in the memory 83-3. In this manner, the third set of driving signals for the bimorphs 22 and 25 has been stored in the memory 83-3 and the output signals l₃, l₄ and l₅ of the light receiving regions 48-3, 48-4 and 47 have the following relations: $l_3 = l_4$ and $l_3 + l_4 = l_5$. In this manner, the light spot 10a of the light beam emitted by the LD 10 has been indexed at the third point corresponding to the sixteenth line in the track 34 and the third set of driving signals for the bimorphs 22 and 25 has been stored in the memory 83-3.

After the signals for driving the bimorphs 22 and 25 such that the light spot 10a of the light beam emitted by the LD 10 is indexed at the first, eighth and sixteenth lines in the track 34 have been stored in the memories 83-1, 83-2 and 83-3, respectively, the CPU 54 calculates the six sets of driving signals for driving the bimorphs 22 and 25 such that the light spot is indexed at second to seventh lines in the track 34 on the basis of the first and second sets of driving signals stored in the memories 83-1 and 83-2 and also calculates seven sets of driving signals for driving the bimorphs 22 and 25 such that the light spot is indexed at ninth to fifteenth lines in the track 34 on the basis of the second and third sets of driving signals stored in the memories 83-2 and 83-3. These sixteen sets of driving signals for the bimorphs 22 and 25 are then stored in a memory provided in the CPU 54.

When a data signal is to be recorded in a desired line in a desired track, a desired set of driving signals for driving the bimorphs 22 and 25 such that the light spot is made incident upon the desired line are read out, and then the bimorphs are driven by the thus read out driving signals and the intensity of the light beam emitted by the LD 10 is modulated in accordance with the data signal.

It should be noted that the above mentioned operation for determining the driving signals for indexing the light spot on respective lines in the track is effected each time the optical card 1 is inserted into the optical card reader/writer, However, after the optical card 1 has been set in the reader/writer for a very long time, the above operation may be performed before the data recording operation or at a predetermined interval.

In the present embodiment, the light spot 10a of the light beam emitted by the LD 10 is indexed at the points corresponding to the first, eighth and sixteenth lines in the track by driving the bimorphs 22 and 25 and the driving signals at these points are stored in the memories, and then the signals for driving the bimorphs such that the light spot is made incident upon respective lines in the track 34 are derived on the basis of the above driving signals. Then, the construction of the photodetector 9 and the signal processing circuit can be made simpler than a case in which the light spot is made incident upon a desired line by detecting the light beam reflected by the optical card 1. Further the light spot can be indexed at a desired line in an easy and speedy manner, so that the data signal can be recorded within a short time.

Now the operation for recording the data signal will be explained in detail.

In the present embodiment, a data block is recorded in a line within a track 34 in the track direction. For instance, a unit packet is formed by a majority logic decordable (272, 190) code shortened different set cyclic code consisting of 272 bits (34 bytes) including an information code of 190 bits and an error correction code of 82 bite. Such a packet is generally used in the teletext. When one data block is recorded in one line, the data block is consisting of 26 packets (7072 buts), and data of respective packets are recorded in 68 frames in the relevant line in an interleaving manner. That is to say, as shown in FIG. 10A, successive bit number data 1P-1, 1P-2,---, 1P-272; 2P-1, 2P-2,---, 2P-272;---; 26P-1, 26P-2,---, 26P-272 of successive packets 1P to 26P are recorded every twenty six bits. Therefore, data having the same bit number in respective packets are recorded successively. Then, in each frame 37, successive four bits of respective packets 1P to 26P are recorded every twenty six bits. Upon the reading, the error correction can be performed effectively even if a frame error occurs due to defects on the optical card 1.

When two data blocks are recorded in a single line, each of the data blocks is consisting of 13 packets (3536 bits), and data of 13 brackets of respective data blocks are recorded in 68 frames in the line in an interleaving manner. That is to say, as depicted in FIG. 10B, successive bit number data 1-1P-1, 1-1P-2,---, 1-1P-272; 1-2P-1, 1-2P-2,---, 1-2P-272;---; 1-13P-1, 1-13P-2,---, 1-13P-272 of thirteen packets of the first data block 1-1P to 1-13P and successive bit number data 2-1P-1, 2-1P-2,---, 2-1P-272; 2-2P-1, 2-2P-2,---, 2-2P-272;---; 2-13P-1, 2-13P-2,---, 2-13P-272 of thirteen packets of the second data block 2-1P to 2-13P are alternately recorded every twenty six bits.

When four data blocks are recorded in a single line, each of the data block is consisting of 6 packets (1632 bits) and data of 6 packets on respective data blocks are recorded in 68 frames in the line in an interleaving manner. As shown in FIG. 10C, successive bit number data 1-1P-1, 1-1P-2,---, 1-1P-272; 1-2P-1, 1-2P-2,---, 1-2P-272;---; 1-6P-1, 1-6P-2,---, 1-6P-272 of six packets of the first data block 1-1P to 1-6P, successive bit number data 2-1P-1, 2-1P-2,---, 2-1P-272; 2-2P-1, 2-2P-2,---, 2-2P-272;---; 2-6P-1, 2-6P-2,---, 2-6P-272 of six packets of the second data block 2-1P to 2-6P, successive bit number data 3-1P-1, 3-1P-2,---, 3-1P-272; 3-2P-1, 3-2P-2,---, 3-2P-272;---; 3-6P-1, 3-6P-2,---, 3-6P-272 of six packets of the third data block 3-1P to 3-6P, and successive bit number data 4-1P-1, 4-1P-2,---, 4-1P-272; 4-2P-1, 4-2P-2,---, 4-2P-272;---; 4-6P-1, 4-6P-2,---, 4-6P-272 of six packets of the fourth data block 2-1P to 2-6P are alternately recorded every twenty six bits. In this manner, data having the same bit number in respective packets 1-1P to 1-6P, 2-1P to 2-6P, 3-1P to 3-6P and 4-1P to 4-6P are recorded successively, In this case, in each frame 37 there is formed a margin of two bits between the record region of the fourth data block and the record region of the first data block, so that there are eight bits margin in each frame. In these regions, 0" or 1" is recorded, Moreover, when three data blocks are recorded in a single line, each data block is formed of eight packets and data of these packets are recorded in a similar manner to those explained above. It should be noted that information such as the number of packets per data block, the number of error corrections may be fixedly determined for respective optical cards, or such information may be recorded on the optical card like as usual data and reproduced data may be rearranged into data blocks and the error correction may be performed on the basis of the reproduced information.

As explained above, in the present embodiment, a plurality of data blocks are recorded in each line in such a manner that data of all the data clocks are recorded in all the frames in an interleaving manner. Therefore, even if the number of data in each data block is small, it is possible to obtain a constant error correction rate, so that the data can be always reproduced correctly. Contrary to this, if the data of successive data blocks are recorded continuously, the error correction rate becomes low. Particularly, when the number of data in each data block is small, the error correction rate becomes very low, and thus when the data could not read out for a certain interval, the data could not be reproduced correctly.

Next the operation for recording the data will be explained in detail.

At first, a desired track 34 is sought and the data recorded therein is read out to determined whether or not the out-of track occurs and whether or not the quasi-clock signal is generated. At the same time, it is checked to what frame in the line the data has been recorded. In this case, if the data has been recorded, it is further checked whether or not the error correction can be performed, and if the data has not been recorded, it is checked whether or not all the read out signals are "0" or "1". As the result of this checking operation, when many errors have been found, the optical card 1 is automatically discharged out of the optical card reader/writer and an indication is given to a user to wipe or clean the optical card. When the out-of track occurs, the relative movement of the optical card 1 and the optical head in the track direction is reversed. For instance, during the movement from the seek portion 35A to the seek portion 35B (forward movement), when the out-of track is detected, the remaining record region is read out by effecting the relative movement from the seek portion 35B to the seek portion 35A (backward movement). Then the read out data in the forward movement and that in the backward movement are composed, and it is checked whether or not the error correction can be performed for the thus composed data.

After the above mentioned checking operation has been completed, the bimorphs 22 and 25 are driven such that the light spot of the light beam emitted by the LD 10 is made incident upon the desired line. Then, the direction of the relative movement of the optical card 1 and the optical head is reversed and the intensity of the light beam is modulated with the data to be recorded in synchronism with the clock signal. In this manner, the data signal is recorded in the desired line in the desired track 34. In this case, when the relative movement of the optical card 1 and the optical head in the track direction is in the backward direction, the recorded data may be checked or monitored by a light receiving region corresponding to the relevant line. Moreover, a next data signal is to be recorded successively, the relative movement of the optical card and the optical head is reversed. When this next data signal is to be recorded in a next line, the bimorphs 22 and 25 are driven such that the light beam emitted by the LD 10 is made incident upon this next line. By alternately repeating the data recording operations in the forward and backward directions, the data signals can be recorded continuously. When the out-of track is detected during the checking operation, the data signal is recorded in frames up to a frame in which the out-of track has occurred as long as the error correction can be performed correctly.

In the above embodiment, the light beam emitted by the LD 10 is indexed at the three points corresponding to the first, eighth and sixteenth lines in a track to derive the three sets of driving signals and the remaining sets of driving signals for operating the bimorphs 22 and 25 such that the light beam is indexed at respective lines in a track are calculated from the three sets of driving signals. It is also possible to calculate the driving signals for indexing the light beam at respective lines on the basis of two or more than three sets of driving signals for driving the bimorphs 22 and 25 such that the light beam is made incident upon two or more than three predetermined lines in a track. Further, in the above embodiment, sets of driving signals for respective lines are calculated and stored in the memory, but according to the invention, each time a data signal Is to be recorded, a set of driving signals may be calculated in accordance with a line in which the data signal is to be recorded.

In the above embodiment, when $|FE1-FE2|>V_{ref1}$, $|FE1|>V_{ref2}$ and/or $|FE2|>V_{ref2}$, gains of FE1 and/or FE2 and FT1 and/or FT2 are reduced by five times. According to the invention, the reduction rate of these gains may be set arbitrarily. Further, $|FE1-FE2|>V_{ref1}$, $|FE1|>V_{ref2}$ or $|FE2|>V_{ref2}$, portions of FE1 and TE1 or FE2 and TE2 which exceed $V_{ref2}$ may be cut so that FE=FE1 and and TE=TE1 or FE=FE2 and and TE=TE2. When $|FE1-FE2|>V_{ref1}$, $|FE1|V_{ref2}$ and $|FE2|>V_{ref2}$, FE and TE which have been produced Just at that time may be held.

Moreover in the above embodiment, a data blocks are recorded in a line in the track direction, but a data block may be recorded over a plurality of lines. Further, in the above embodiment, the spot of the light beam emitted by the LD 10 is moved in the track direction by driving the mirror 4, but according to the invention the LD 10 may be driven by a bimorph. In the above optical card 1, the reflecting portion 33 is provided at a position remote from the data record area, but reflecting portions may he provided at positions between each tracks and the seek portions 35A and 35B, respectively. In the above embodiment, the clock signal and the servo-control signal such as the focusing error signal and tracking error signal are derived by detecting two adjacent clock pattern lines 36 simultaneously, but according to the invention, more than two clock pattern lines may be scanned simultaneously.

Figure 11:
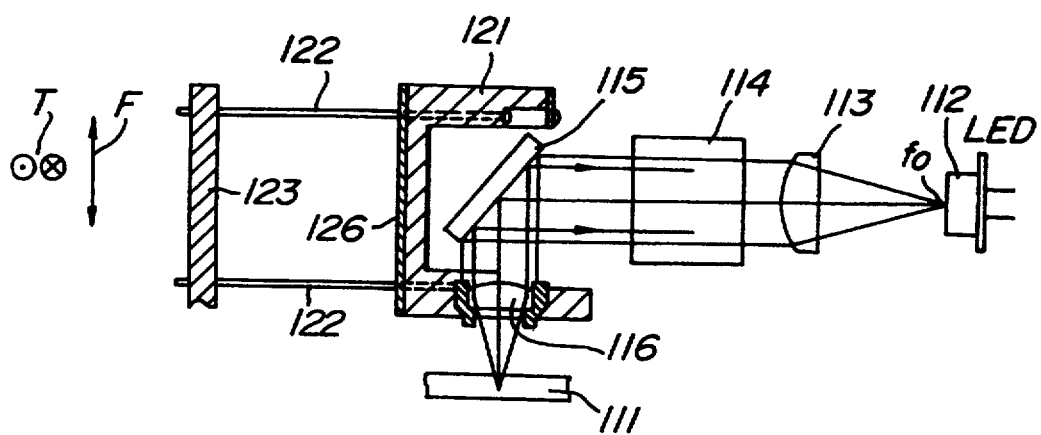
FIG. 11 is a longitudinal cross sectional view illustrating another embodiment of the optical head of the optical card reader comprising another embodiment of the servo-control apparatus according to the invention.
Figure 12:
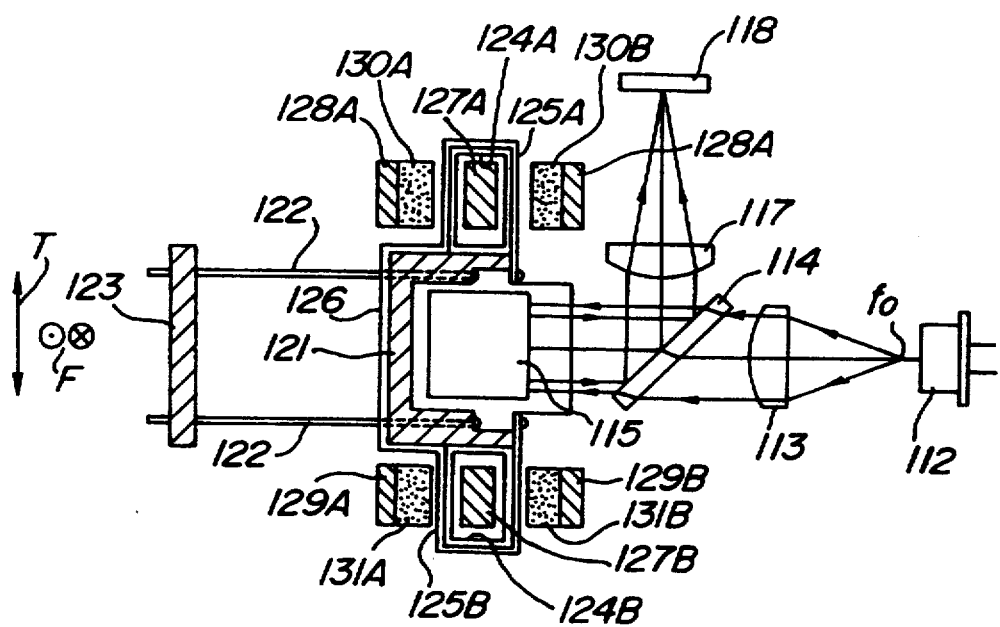
FIG. 12 is a lateral cross sectional view of the optical head shown in FIG. 11.

FIGS. 11 and 12 are longitudinal and lateral cross sections showing the construction of the optical head of the optical card reader including another embodiment of the servo-control apparatus according to the invention. The optical card reader functions to read the data recorded on an optical card 111 by relatively moving the optical card and an optical head in the track direction. A light emitting diode (LED) 112 for emitting an illuminating light beam is arranged at a position which is slightly backward with respect to a focal point $f_0$ of a collimator lens 113. The illuminating light beam emitted by the LED 112 is made incident upon the optical card 111 normally by means of the collimator lens 113, half mirror 114, reflection mirror 115 and objective lens 116, so that the optical card 111 is illuminated by the light beam in the de-focused condition. A light beam reflected by the optical card 111 is made incident upon a photodetector 118 by means of the objective lens 116, mirror 115, half mirror 114 and imaging lens 117.

The objective lens 116 is secured to a holder 121 which is supported by a wire holder 123 secured to a stationary member (not shown) by means of four resilient wires 122 movably in the focusing direction F parallel with the optical axis of the objective lens 116 as well as in the tracking direction T perpendicular both to the focusing direction F and the track direction in which the tracks on the optical card 111 extend. On side walls of the holder 121 opposing in the tracking direction T are secured focusing coils 124A and 124B, respectively, and on these focusing coils are secured a flexible substrate 126 on which tracking coils 125A and 125B are formed as printed coils.

To the stationary member are secured inner yokes 127A and 127B which are inserted into the focusing coils 124A and 124B, respectively. To the stationary member there are further secured two pairs of outer yokes 128A, 128B and 129A, 129B which are opposed to the inner yokes 127A and 127B, respectively by interleaving the focusing coils 124A and 124B and tracking coils 125A and 125B therebetween. On inner walls of the outer yokes 128A, 128B and 129A, 129B are secured permanent magnets 130A, 130B and 131A, 131B, respectively. The permanent magnets 103A and 130B produce a magnetic flux passing through the tracking coil 125A and focusing coil 124A, and the permanent magnets 131A and 131B produce a magnetic flux passing through the tracking coil 125B and focusing coil 124B.

To the focusing coils 124A and 124B is supplied a focusing error signal by means of two resilient wires 122 and the objective lens 116 can be moved in the focusing direction F together with the holder 121 to perform the focusing servo-control. A tracking error signal is supplied to the tracking coils 125A and 125B via the remaining two wires 122 and the holder 121 and thus the objective lens 116 are moved in the tracking direction T to effect the tracking servo-control. The LED 112, collimator lens 113, half mirror 114, reflection mirror 115, imaging lens 117 and photodetector 118 are all secured to the stationary member not shown.

Figure 13:
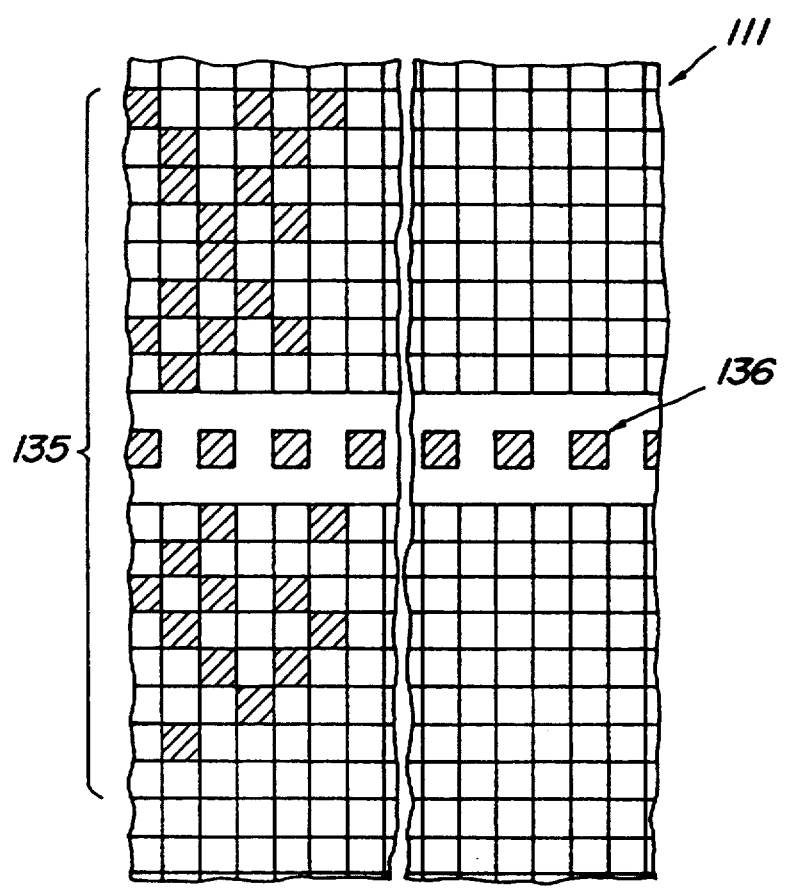
FIG. 13 is a plan view representing the track format of the optical card.

FIG. 13 shows the track format of the optical card 111. A track 135 comprises a guide line 136 consisting of a black and white pattern and eight data lines recorded on respective sides of the guide line, so that the track is formed of a single guide line 136 and sixteen data lines.

Figure 14:
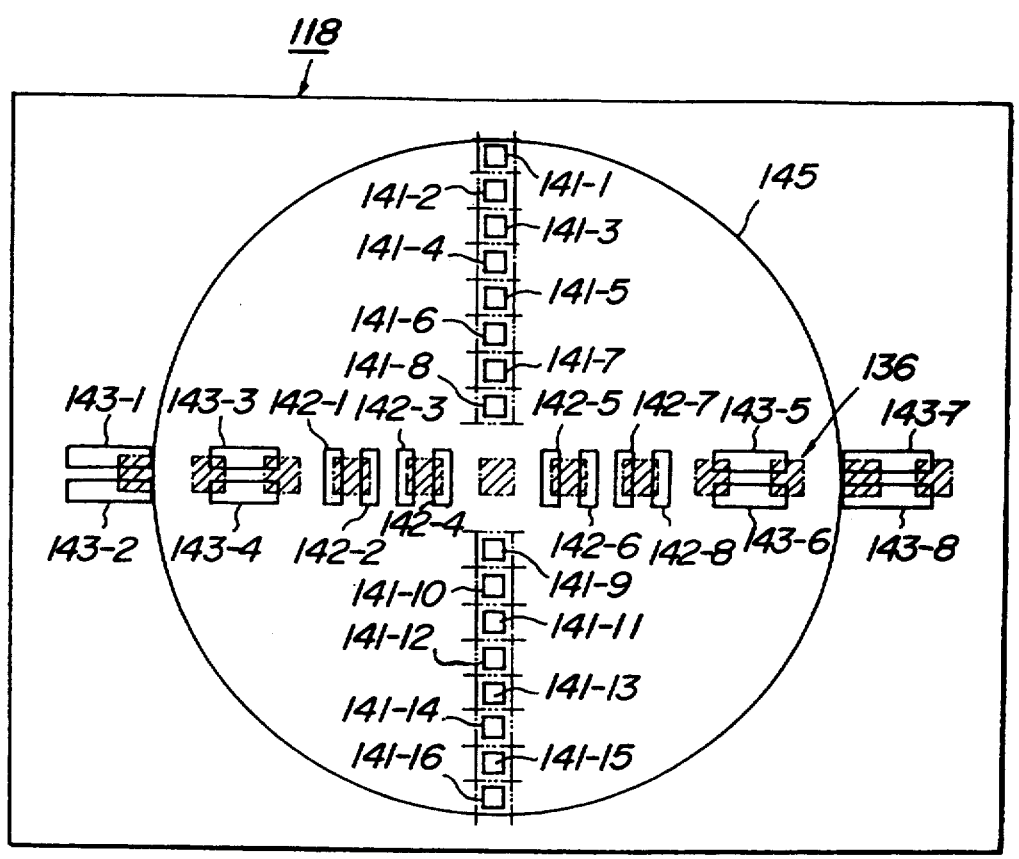
FIG. 14 is a plan view illustrating the construction of the photodetector shown in FIG. 11.

FIG. 14 is a plan view illustrating the construction of the photodetector 118. The photo-detector 118 comprises sixteen data reading light receiving regions 141-1 to 141-16 for receiving images of the data lines, four pairs of clock generating light receiving regions 142-1 to 142-8 for receiving image of front and rear edges of the block pattern of the guide line 136 in the track direction, and four pairs of servo-signal generating light receiving regions 143-1 to 143-8 for receiving images of upper and lower edges of the square block pattern of the guide line in the tracking direction.

As explained above, also in the present embodiment, the LED 112 is arranged at the position out of the focal point $f_0$ of the collimator lens 113, so that the optical card 111 is illuminated in the de-focused condition. Therefore, the distribution in the luminance intensity of the illuminating light on the optical card 111 is changed in the same manner as that of the first embodiment. That is to say, as shown in FIG. 3, when the objective lens 116 is correctly focused on the optical card 111, the distribution in the luminance intensity of the illumination light is represented by the solid curve A, and when the objective lens 116 moves nearer to or remote from the optical card 116, the distribution in the luminance intensity of the illuminating light is changed as shown by the broken curve B or the chain curve C. There is produced the ring-shaped unchanged region 13 in which the luminance intensity of the illuminating light is not substantially changed even if the distance between the objective lens 116 and the optical card 111 is changed.

In FIG. 14, the ring-shaped unchanged region is denoted by 145, and the data reading light receiving regions 141-1 to 141-16 are arranged within the unchanged region 145 and are aligned in the diameter of the unchanged region. The two pairs of the servo-signal generating light receiving regions 143-3, 143-4 and 143-5, 143-6 are arranged such that their centers are situated within the unchanged region 145 symmetrically with respect to a center point of the data reading light receiving regions 141-1 to 141-16. The remaining two pairs of the servo-signal generating light receiving regions 143-1, 143-2 and 143-7, 143-8 are arranged such that their centers are situated outside the ring-shaped unchanged region 145 symmetrically with respect to the center of the light receiving regions 141-1 to 141-16. The four pairs of the clock generating light receiving regions 142-1 to 142-8 are arranged between the light receiving regions 143-3, 143-4 and the light receiving regions 143-5 and 143-6.

The clock signal generating light receiving regions 142-1 to 142-8 are separated equidistantly at half a pitch of the black and white pattern of the guide line 136. Each of the servo-signal generating light receiving regions 143-1 to 143-8 has such configuration and size that in the in-track condition in which the center of the illuminating light beam (optical axis of the objective lens 116) is aligned with the center of the track 135, the images of upper and lower edges of a plurality of square black blocks in the guide pattern line 136 and a sufficient amount of light reflected by the white portion having a high reflectance between the guide pattern line 136 and the data pits.

The clock signal is derived by a difference between a sum of output signals of the light receiving regions 142-1, 142-3, 142-5, 142-7 and a sum of output signals of the light receiving regions 142-2, 142-4, 142-6, 142-8.

Figure 15:
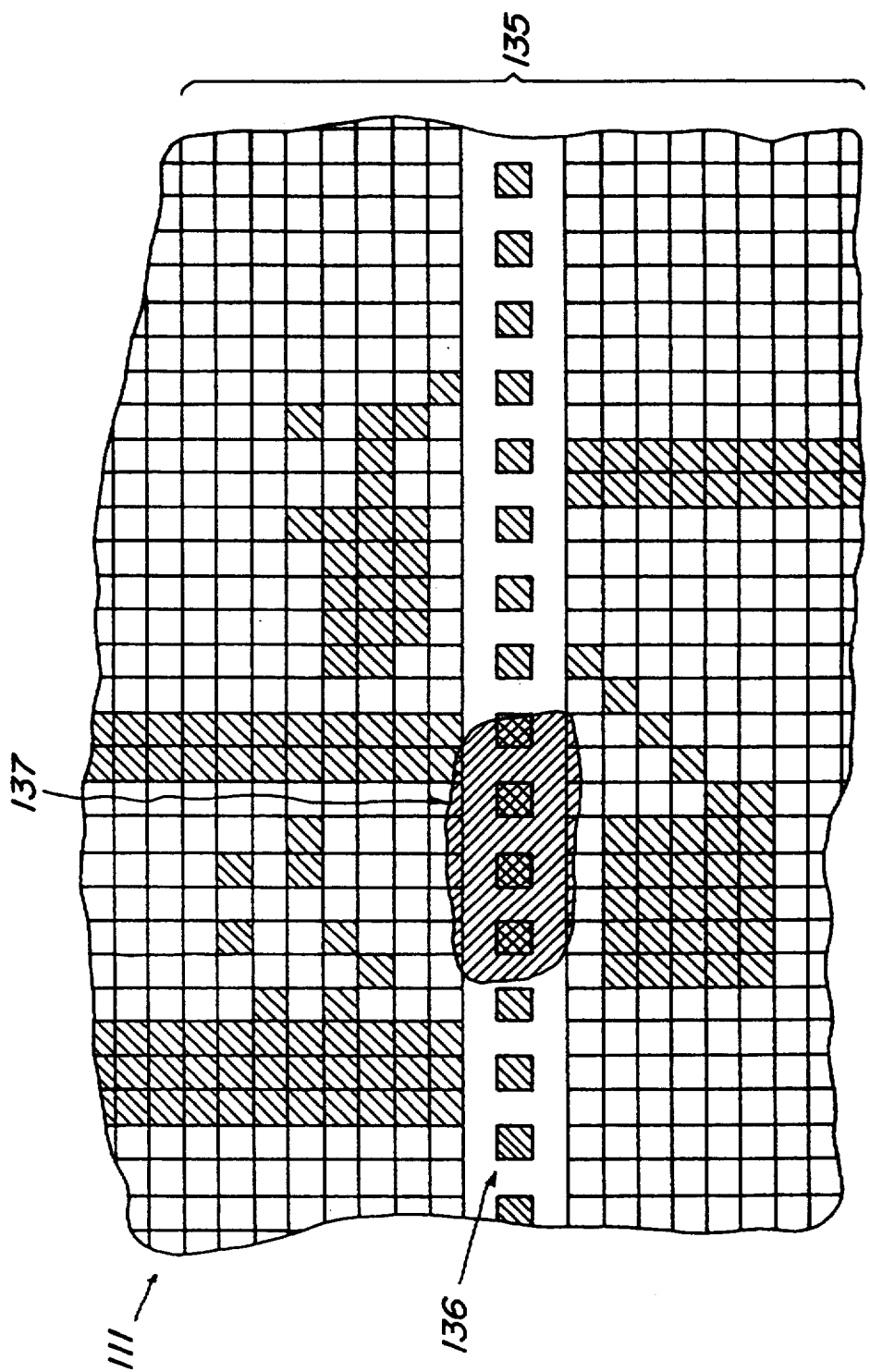
FIG. 15 is a plan view showing a defect on the optical card.

When a defect 137 exists on the optical card 111 as shown in FIG. 15, it is difficult to derive the servo-control signal such as the focusing error signal and tracking error signal. In the present embodiment, the servo-control signal can be derived correctly without being affected by the defect 137 on the optical card 111. To this end, there are provided a plurality of servo-control signal detecting systems and one of them which is not influenced by the defect is selected, and the servo-control signal is obtained from the selected servo-control signal detecting system.

Figure 16:
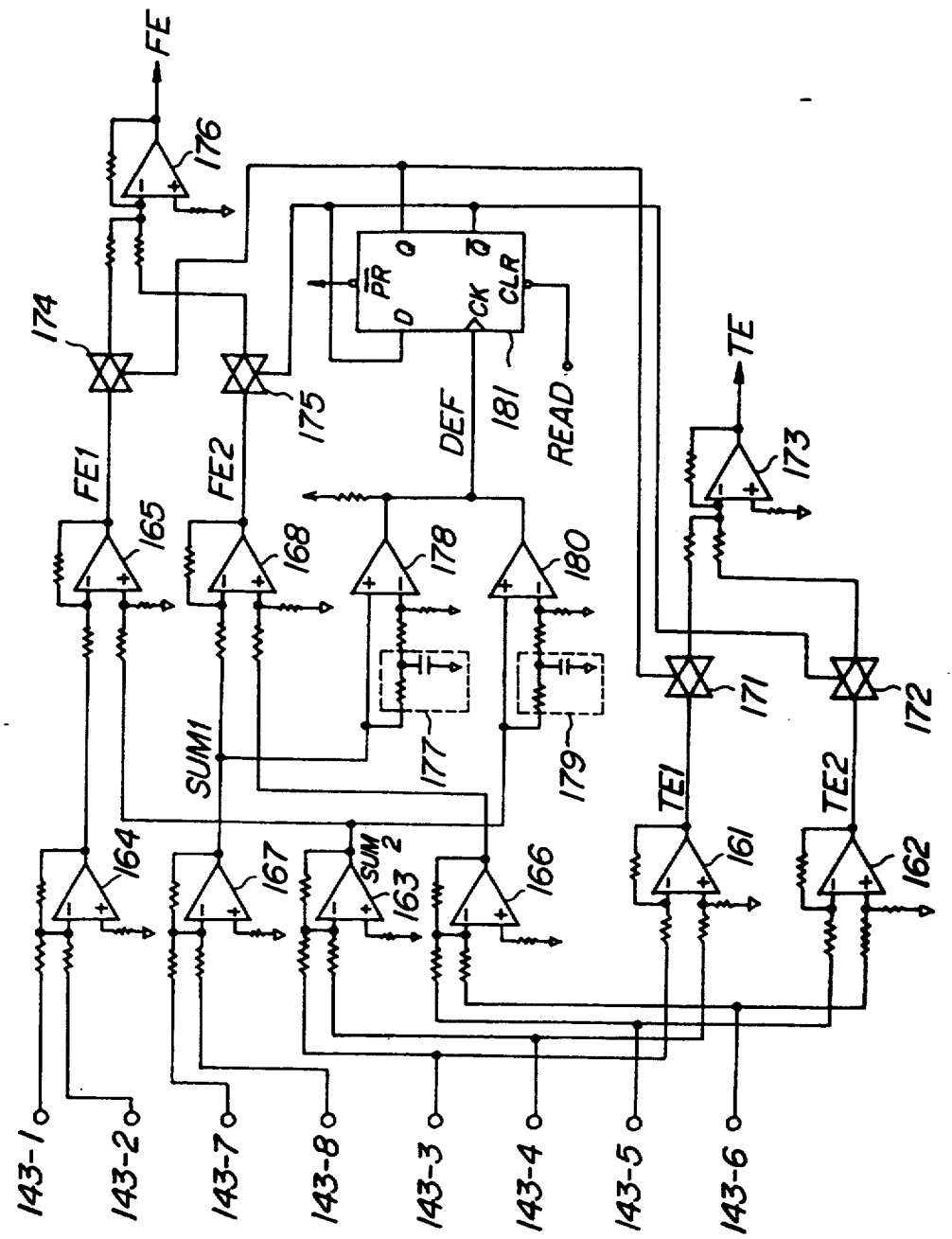
FIG. 16 is a circuit diagram of the signal processing circuit of the servo-control apparatus.

FIG. 16 is a circuit diagram showing the construction of the signal processing circuit for deriving the servo-control signal such as the focusing and tracking signals. The output signal generated by the light receiving region 143-3 receiving the image of the upper edges of the square blocks in the guide pattern line 136 and the output signal generated by the light receiving region 143-4 receiving the image of the lower edges of the square blocks in the guide pattern line are applied to a differential amplifier 161 to derive a difference therebetween as a first tracking error signal TE1. Similarly, the output signal generated by the light receiving region 143-5 receiving the image of the upper edges of the square blocks in the guide pattern line 136 and the output signal generated by the light receiving region 143-6 receiving the image of the lower edges of the square blocks in the guide pattern line are applied to a differential amplifier 162 to derive a second tracking error signal TE2.

The output signals of the light receiving regions 143-3 and 143-4 whose centers situated within the ring-shaped unchanged region 145 are added by an adder 163 to derive a sum signal (SUM2). The output signals of the light receiving regions 143-1 and 143-2 whose centers situated within the unchanged region 145 are added by an adder 164. Then, a difference between these sum signals is derived by a differential amplifier 165 to obtain a first focusing error signal FE1. Similarly, the output signals of the light receiving regions 143-5 and 143-6 are added in an adder 166 and the output signals of the light receiving regions 143-7 and 143-8 are added in an adder 167 to derive a sum signal (SUM1). Then, a difference between these sum signals is derived by a differential amplifier 168 to obtain a second focusing error signal FE2.

The first and second tracking error signals TE1 and TE2 are added by an adder 173 via analog switches 171 and 172 to derive a final tracking error signal TE. Similarly, the first and second focusing error signals FE1 and FE2 are added by an adder 176 by means of analog switches 174 and 175 to obtain a final focusing error signal FE.

When the defect 137 existing on the optical card 111 as illustrated in FIG. 15 passes through the photodetector 118 in the direction from the light receiving regions 143-1, 143-2 to the light receiving regions 143-7, 143-8, the sum signals SUM2 and SUM1 are changed as shown in FIGS. 17A and 17B, respectively.

As depicted in FIG. 16, the sum signal SUM1 is supplied to a low pass filter 177 to derive a threshold value, and the sum signal SUM1 is compared with the thus driven threshold value in a comparator 178. Similarly, the sum signal SUM2 is supplied to a low pass filter 179 to derive a threshold value, and the sum signal SUM2 is compared with the thus driven threshold value in a comparator 180. Then, the comparator 178 and 190 can detect the reduction in the light due to the defect 137. The output signals of the comparators 178 and 180 are supplied to a wired-OR circuit to produce a DEF signal, and the DEF signal is supplied to a clock input of D-flip-flop (D-FF) 181. $\overline{Q}$ output of the D-FF 181 is feedback to a D-input. The analog switches 172 and 175 are controlled by the $\overline{Q}$ output signal of the D-FF 181 such that when the $\overline{Q}$ output signal has the logic high level, the analog switches 172 and 175 are made on, but when the Q output signal is in the logic low level, these analog switches are made off. Similarly, the analog switches 171 and 174 are controlled by the Q output signal of the D-FF 181 such that when the Q output signal is in the logic high level, these analog switches are made on, but when the Q output signal has the logic low level, these analog switches are made off.

Now it is assumed that the defect 137 moves from the light receiving regions 143-1, 143-2 to the light receiving regions 143-7, 143-8. Then, at an instant at which a first pulse of the DEP signal shown in FIG. 17C arises, the Q output signal of the D-FF 182 becomes high (H) and the $\overline{Q}$ output signal becomes low (L), and at an instant at which a second pulse of the DEF signal arises, the Q output of the D-FF 181 becomes L and the $\overline{Q}$ output signal changes into H as illustrated in FIGS. 17D and 17E, when the read signal READ shown in FIG. 17F is applied to the D-FF 181.

Therefore, at first the servo-control is performed by the focusing error signal FE2 and the tracking error signal TE2, and after the first pulse of the DEF signal has arisen so that it has been confirmed that the defect 137 has passed through the light receiving regions 143-1, 143-2, 143-3 and 143-4, the servo-control signal is changed into the focusing error signal FE1 and tracking error signal TE1. Then, after the second pulse of the DEF signal has arisen so that it has been confirmed that the defect 137 has passed through the light receiving regions 143-5, 143-6, 143-7 and 143-8, the servo-control signal is changed from the focusing error signal FE1 into the focusing error signal FE2 and tracking error signal TE2.

It should be noted that when the defect 137 moves from the light receiving regions 143-7, 143-8 to the light receiving regions 143-1, 143-2, the defect is detected by the sum signals SUM1 and SUM2. At first, the servo-control is performed by FE1 and TE1, and while the defect is passing through the photodetector 118, the servo-control is carried by FE2 and TE2, and after the defect has passed away, FE1 and TE1 are used again to effect the servo-control.

In the above mentioned embodiment, timings for exchanging the servo-control signal may be carried out by various methods. For instance, when it is detected by the rising edge of the sum signal SUM2 that the defect has passed through the light receiving regions 143-1, 143-2, 143-3 and 143-4, a monostable multivibrator is actuated and the error signal is changed into FE1 and TE1 for a predetermined time period. Alternatively, the timing for changing the error signal may be controlled by a microcomputer.

As explained above in detail, according to the invention, there are provided a plurality of detecting systems for detecting the servo-control signal such as the tracking error signal and the focusing error signal, and one of the detecting systems is selectively used in such a manner that the servo-control signal could be obtained always correctly without being affected by the defect on the optical record medium. Therefore, the servo-control can be performed always accurately, and thus the data recording and reproducing can be performed correctly.

What is claimed is:

1. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:

sensing means receiving said image of said portion of said record medium and including a plurality of error detecting systems for generating, in response to said image, a plurality of focusing error signals each independently indicating a first aspect of said positional deviation and a plurality of tracking error signals each independently indicating a second aspect of said positional deviation;

signal processing means for receiving said plurality of focusing error signals and said plurality of tracking error signals and producing a focusing servo-control signal on the basis of said plurality of focusing error signals and a tracking servo-control signal on the basis of the plurality of tracking error signals; and actuator means for correcting a relative position between the optical record medium and the objective lens to eliminate said positional deviation in accordance with the focusing servo-control signal and the tracking servo-control signal, wherein said plurality of error detecting systems produce said plurality of focusing error signals and said plurality of tracking error signals at a plurality of guide lines simultaneously.

2. A servo-control apparatus according to claim 1, wherein said signal processing means comprises judgment means for selecting one of said error detecting systems which is not affected by any defect on said record medium, and wherein said signal processing means produces said servo-control signal by employing error signals from said one of said error detecting systems selected by said judgment means.

3. A servo-control apparatus according to claim 2, wherein said signal processing means comprises a judging means for comparing magnitudes of said plurality of focusing error signals and said plurality of tracking error signals to produce a judgement signal, and a servo-control signal generating means for generating the focusing servo-control signal and the tracking servo control signal in accordance with said judgement signal.

4. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:

sensing means receiving said image of said portion of said record medium and including a plurality of error detecting systems for generating, in response to said image, a plurality of error signals of the same kind each independently indicating said positional deviation;

signal processing means for receiving said plurality of error signals and producing a servo-control signal on the basis of the plurality of error signals; and actuator means for correcting a relative position between the optical record medium and the objective lens to eliminate said positional deviation in accordance with the servo-control signal, wherein:

said plurality of error detecting systems produce said plurality of error signals at a plurality of guide lines simultaneously, said signal processing means comprises a judging means for judging the condition of said plurality of error signals to produce a judgment signal, and a servo-control signal generating means for generating the servo-control signal in accordance with said judgment signal, and said plurality of error detecting systems comprise two sets of focusing error detecting systems for generating first and second focusing error signals FE1 and FE2 and two sets of tracking error detecting systems for detecting first and second tracking error signals TE1 and TE2, and said signal processing means comprises a first comparator circuit for comparing an absolute value of a difference between the first and second focusing error signals FE1 and FE2 with a first reference value $V_{ref1}$, a second comparator circuit for comparing an absolute value of the first focusing error signal FE1 with a second reference value $V_{ref2}$, a third comparator circuit for comparing an absolute value of the second focusing error signal FE2 with the second reference value $V_{ref2}$, and a circuit for producing said servo-control signal comprising a focusing error signal FE and a tracking error signal TE in the following manner:

(1) FE=FE1+FE2 and TE=TE1+TE2, when $\|FE1-FE2\| \leq V_{ref1}$;

(2) FE=FE1/n+FE2 and TE=TE1/n+TE2 when $\|FE1-FE2\| > V_{ref1}$, $\|FE1\| > V_{ref2}$ and $\|FE2\| \leq V_{ref2}$;

(3) FE=FE1+FE2/n and TE=TE1+TE2/n, when $\|FE1-FE2\| > V_{ref1}$, $\|FE1\| \leq V_{ref2}$ and $\|FE2\| > V_{ref2}$; and (4) FE=(FE1+FE2)/n and TE=(TE1+TE2)/n, when $\|FE1-FE2\| > V_{ref1}$, $\|FE1\| > V_{ref2}$ and $\|FE2\| > V_{ref2}$, wherein n is larger than 1.

5. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:

sensing means receiving said image of said portion of said record medium and including a plurality of error detecting systems for generating, in response to said image, a plurality of focusing error signals each independently indicating a first aspect of said positional deviation and a plurality of tracking error signals each independently indicating a second aspect of said positional deviation;

signal processing means for receiving said plurality of focusing error signals and said plurality of tracking error signals and producing a focusing servo-control signal on the basis of said plurality of focusing error signals and a tracking servo-control signal on the basis of the plurality of tracking error signals; and actuator means for correcting a relative position between the optical record medium and the objective lens to eliminate said positional deviation in accordance with the focusing servo-control signal and the tracking servo-control signal, wherein said plurality of error detecting systems includes a first plurality of pairs of light receiving elements for generating a clock signal and a second plurality of pairs of light receiving elements, operative independently from said first plurality of pairs of light receiving elements, for deriving said plurality of focusing error signals and said plurality of tracking error signals at different points on the same guide track simultaneously.

6. A servo-control apparatus according to claim 5, wherein said signal processing means comprises a defect detecting means for detecting defects on the optical record medium to produce a defect signal, and a selecting means for selecting one of said plurality of error signals in accordance with said defect signal, said error signal being not influenced by the defects.

7. A servo-control apparatus according to claim 6, wherein said defect detecting means generates said defect signal in accordance with a change in a focus sum signal which is used to produce one of said plurality of focus error signals.

8. A servo-control apparatus according to claim 7, wherein said focus sum signal is a sum of signals produced by one of said second plurality of pairs of light receiving elements.

9. A servo-control apparatus according to claim 5, wherein said second plurality of pairs of light receiving elements comprises:
 a first sub-plurality of pairs of light receiving elements for deriving a first one of said plurality of focusing error signals and a first one of said plurality of tracking error signals; and
 a second sub-plurality of pairs of light receiving elements for deriving a second one of said plurality of focusing error signals and a second one of said plurality of tracking error signals.

10. A servo-control apparatus according to claim 9, wherein said first plurality of pairs of light receiving elements is disposed between said first and second sub-pluralities of pairs of light receiving elements.

11. A servo-control apparatus according to claim 10, wherein said signal processing means comprises:
 judgment means for selecting one of said first and second sub-pluralities of pairs of light receiving elements which is not affected by a defect on said record medium; and
 selecting means for selecting said first or second one of said plurality of focusing error signals for use as said focusing servo-control signal, and for selecting said first or second one of said plurality of tracking error signals for use as said tracking servo-control signal, in accordance with an output of said judgment means.

12. A servo-control apparatus according to claim 11, wherein said judgment means comprises:
 first comparing means for comparing an output from said first sub-plurality of pairs of light receiving elements with a threshold value to obtain a first comparison signal; and
 second comparing means for comparing an output from said second sub-plurality of pairs of light receiving elements with said threshold value to obtain a second comparison signal.

13. A servo-control apparatus according to claim 12, wherein said judgment means further comprises:
 gate means, responsive to said first and second comparison signals, for producing a defect signal when either of said first and second comparison signals indicates that said defect is present; and
 flip-flop means, responsive to said defect signal, for outputting a Q signal indicating that said first one of said plurality of focusing error signals and said first one of said plurality of tracking error signals are to be used as said focusing servo-control signal and said tracking servo-control signal and for outputting an inverted Q signal indicating that said second one of said plurality of focusing error signals and said second one of said plurality of tracking error signals are to be used as said focusing servo-control signal and said tracking servo-control signal; and wherein said selecting means comprises a plurality of switch means, responsive to said Q signal and to said inverted Q signal, for turning on or off said first and second ones of said plurality of focusing error signals and said first and second ones of said plurality of tracking error signals.

14. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:
 sensing means receiving said image of said portion of said record medium and including a plurality of error detecting systems for generating, in response to said image, a plurality of error signals of the same kind each independently indicating said positional deviation;
 signal processing means for receiving said plurality of error signals and producing a servo-control signal on the basis of the plurality of error signals; and
 actuator means for correcting a relative position between the optical record medium and the objective lens to eliminate said positional deviation in accordance with the servo-control signal,
wherein:
said plurality of detecting systems generate said plurality of error signals at different points on a same one of said guide lines,
said signal processing means comprises a defect detecting means for detecting defects on the record medium to produce a defect signal and a selecting means for selecting one of said plurality of error signals in accordance with said defect signal, said one of said error signals being not influenced by said defects, and
said plurality of error detecting systems comprise two sets of focusing error detecting systems for generating first and second focusing error signals FE1 and FE2 at first and second points, respectively on the same guide line, and said defect detecting means comprises first and second defect detecting circuits for generating first and second defect signals at said first and second points, respectively, and a circuit for producing said servo-control signal comprising a focusing error signal FE and a tracking error signal TE in the following manner:
 FE=FE2 and TE=TE2, when the optical record medium and the optical head are relatively moved in a first direction from said first point to said second point and both said first and second defect detecting circuits do not detect a defect;
 FE=FE1 and TE=TE1, when the optical record medium and the optical head are relatively moved in said first direction and said first defect detecting circuit detects a defect;
 FE=FE2 and TE=TE2, when the optical record medium and the optical head are relatively moved in said first direction and said second defect detecting circuit detects a defect;
 FE=FE1 and TE=TE1, when the optical record medium and the optical head are relatively moved in a second direction from said second point to said first point and said first and second defect detecting circuits do not detect a defect; and FE=FE2 and TE=TE2, when the optical record medium and the optical head are relatively moved in said second direction and said second defect detecting circuit detects a defect; and FE=FE1 and TE=TE1, when the optical record medium and the optical head are relatively moved in said second direction and said second defect detecting-circuit detects a defect.

15. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:

sensing means, receiving said image of said portion of said record medium and including a plurality of error detecting systems, for generating, in response to said image, a plurality of focusing error signals each independently indicating said positional deviation;

signal processing means for receiving said plurality of focusing error signals and producing a focusing servo-control signal on the basis of the plurality of focusing error signals; and actuator means for correcting a relative position between the optical record medium and the objective lens to eliminate said positional deviation in accordance with the focusing servo-control signal, wherein said plurality of error detecting systems produce said plurality of focusing error signals at a plurality of guide lines simultaneously.

16. A servo-control apparatus for correcting a positional deviation between an optical record medium including guide lines and data lines and an objective lens in an optical head of a data recording and/or reproducing apparatus, said optical head including a light source which emits a light beam which is projected by said objective lens onto the record medium to illuminate a portion of the record medium and an optical system which receives reflected light from said record medium resulting from said light beam and forms an image of said portion of said record medium, said servo-control apparatus comprising:

sensing means, receiving said image of said portion of said record medium and including a plurality of error detecting systems, for generating, in response to said image, a plurality of tracking error signals each independently indicating said positional deviation;

signal processing means for receiving said plurality of tracking error signals and producing a tracking servo-control signal on the basis of the plurality of tracking error signals; and actuator means for correcting a relative position between the optical record medium and the objective lens to eliminate said positional deviation in accordance with the tracking servo-control signal, wherein said plurality of error detecting systems produce said plurality of tracking error signals at a plurality of guide lines simultaneously.

* * * * *

UNITED STATES PATENT AND TRADEMARK OFFICE
CERTIFICATE OF CORRECTION

PATENT NO. : 5,412,636
DATED : May 2, 1995
INVENTOR(S) : Hashimoto et al

It is certified that error appears in the above-indentified patent and that said Letters Patent is hereby corrected as shown below:

ON THE TITLE PAGE:

Item [75], Inventors, change "Keitaro Hashimoto; Takashi Aoki, both of Tokyo, Japan" to —Akihiko Hashimoto, Deceased, formerly of Tokyo, Japan, by Keitaro Hashimoto, Heir, of Tokyo, Japan; Takashi Aoki, of Tokyo, Japan—.

Signed and Sealed this

Sixteenth Day of January, 1996

Attest:

BRUCE LEHMAN

Attesting Officer

Commissioner of Patents and Trademarks